(12) United States Patent
Lee

(10) Patent No.: US 12,713,047 B2
(45) **Date of Patent: *Aug. 18, 2026**

(54) METHOD AND DEVICE FOR PROCESSING VIDEO SIGNAL BY USING AFFINE MOTION PREDICTION

(71) Applicant: Nokia Technologies Oy, Espoo (FI)

(72) Inventor: Jaeho Lee, Seoul (KR)

(73) Assignee: Nokia Technologies Oy, Espoo (FI)

(*) Notice: Subject to any disclaimer, the term of this patent is extended or adjusted under 35 U.S.C. 154(b) by 6 days.

This patent is subject to a terminal disclaimer.

(21) Appl. No.: 18/913,500

(22) Filed: Oct. 11, 2024

(65) Prior Publication Data

US 2025/0119568 A1 Apr. 10, 2025

Related U.S. Application Data

(63) Continuation of application No. 18/224,967, filed on Jul. 21, 2023, now Pat. No. 12,143,615, which is a (Continued)

(30) Foreign Application Priority Data

Jun. 4, 2018 (KR) ........................ 10-2018-0064187

(51) Int. Cl.
*H04N 19/105* (2014.01)
*H04N 19/176* (2014.01)
(Continued)

(52) U.S. Cl.
CPC ........... *H04N 19/44* (2014.11); *H04N 19/105* (2014.11); *H04N 19/176* (2014.11); *H04N 19/70* (2014.11)

(58) Field of Classification Search
CPC ............................ H04N 19/44; H04N 19/105
See application file for complete search history.

(56) References Cited

U.S. PATENT DOCUMENTS

2017/0332095 A1* 11/2017 Zou ........................ H04N 19/44
2018/0098063 A1* 4/2018 Chen .................... H04N 19/139
(Continued)

FOREIGN PATENT DOCUMENTS

KR 10-1366242 B1 2/2014
KR 10-1611437 B1 4/2016
(Continued)

*Primary Examiner* — Irfan Habib
(74) *Attorney, Agent, or Firm* — McCarter & English, LLP

(57) ABSTRACT

Disclosed are a method for processing a video signal by using an affine motion prediction and an apparatus thereof. A method for processing a video signal according to the present disclosure may include: adding, to an affine candidate list, an affine coded block coded in an affine prediction mode among neighbor blocks of a current block; obtaining a syntax element indicating a candidate used for the affine motion prediction of the current block in the affine candidate list; deriving a control point motion vector predictor of the current block based on an affine motion model of the candidate indicated by the syntax element; deriving a control point motion vector of the current block by adding a control point motion vector difference to the control point motion vector predictor; and generating a prediction block of the current block by using the control point motion vector of the current block.

10 Claims, 14 Drawing Sheets

Related U.S. Application Data continuation of application No. 17/831,119, filed on Jun. 2, 2022, now Pat. No. 11,758,170, which is a continuation of application No. 15/734,362, filed as application No. PCT/KR2019/006749 on Jun. 4, 2019, now Pat. No. 11,368,702.

(51) Int. Cl.
*H04N 19/44* (2014.01)
*H04N 19/70* (2014.01)

(56) References Cited

U.S. PATENT DOCUMENTS

| | | | | |
|---|---|---|---|---|
| 2019/0058896 | A1* | 2/2019 | Huang | H04N 19/61 |
| 2019/0208211 | A1* | 7/2019 | Zhang | H04N 19/517 |
| 2020/0014931 | A1* | 1/2020 | Hsiao | H04N 19/517 |
| 2020/0036997 | A1* | 1/2020 | Li | H04N 19/139 |
| 2020/0059651 | A1* | 2/2020 | Lin | H04N 19/149 |
| 2020/0092578 | A1* | 3/2020 | Huang | H04N 19/52 |
| 2020/0244989 | A1* | 7/2020 | Lee | H04N 19/51 |
| 2020/0413082 | A1* | 12/2020 | Li | H04N 19/176 |
| 2021/0195234 | A1* | 6/2021 | Zhang | H04N 19/70 |
| 2021/0203943 | A1* | 7/2021 | Lin | G06T 3/02 |
| 2021/0227207 | A1* | 7/2021 | Zhang | H04N 19/184 |
| 2021/0321092 | A1* | 10/2021 | Zhang | H04N 19/517 |
| 2021/0360227 | A1* | 11/2021 | Zhao | H04N 19/46 |
| 2021/0400298 | A1* | 12/2021 | Zhao | H04N 19/513 |
| 2022/0021894 | A1* | 1/2022 | Chen | H04N 19/105 |

FOREIGN PATENT DOCUMENTS

| | | | |
|---|---|---|---|
| KR | 10-2018-0028513 | A | 3/2018 |
| KR | 10-2018-0057564 | A | 5/2018 |

* cited by examiner

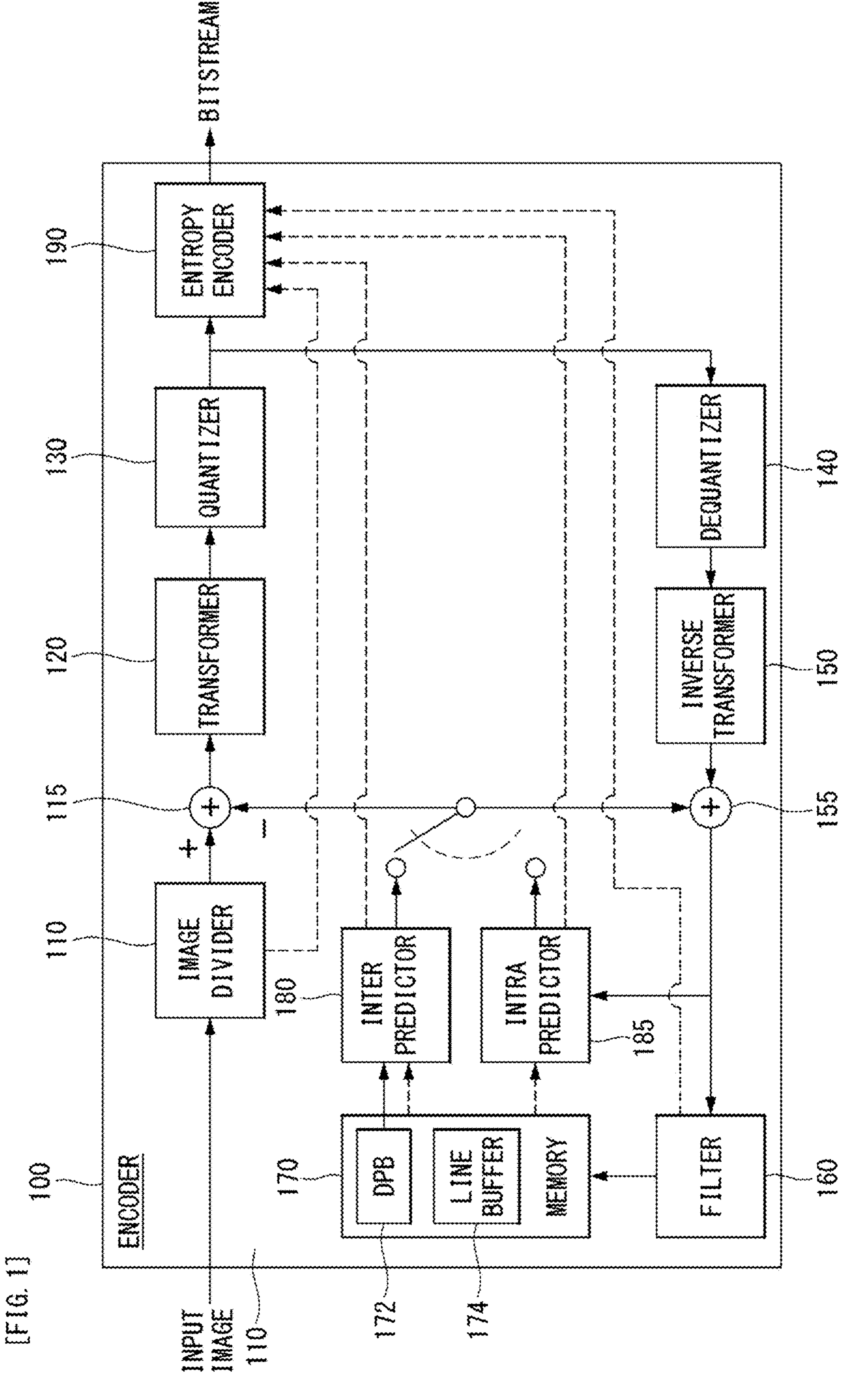
[FIG. 1]
BITSTREAM
ENCODER
100
ENTROPY ENCODER
190
QUANTIZER
130
TRANSFORMER
120
115
IMAGE DIVIDER
110
INPUT IMAGE
110
INTER PREDICTOR
180
INTRA PREDICTOR
185
DPB
172
LINE BUFFER
174
MEMORY
170
DEQUANTIZER
140
INVERSE TRANSFORMER
150
155
FILTER
160

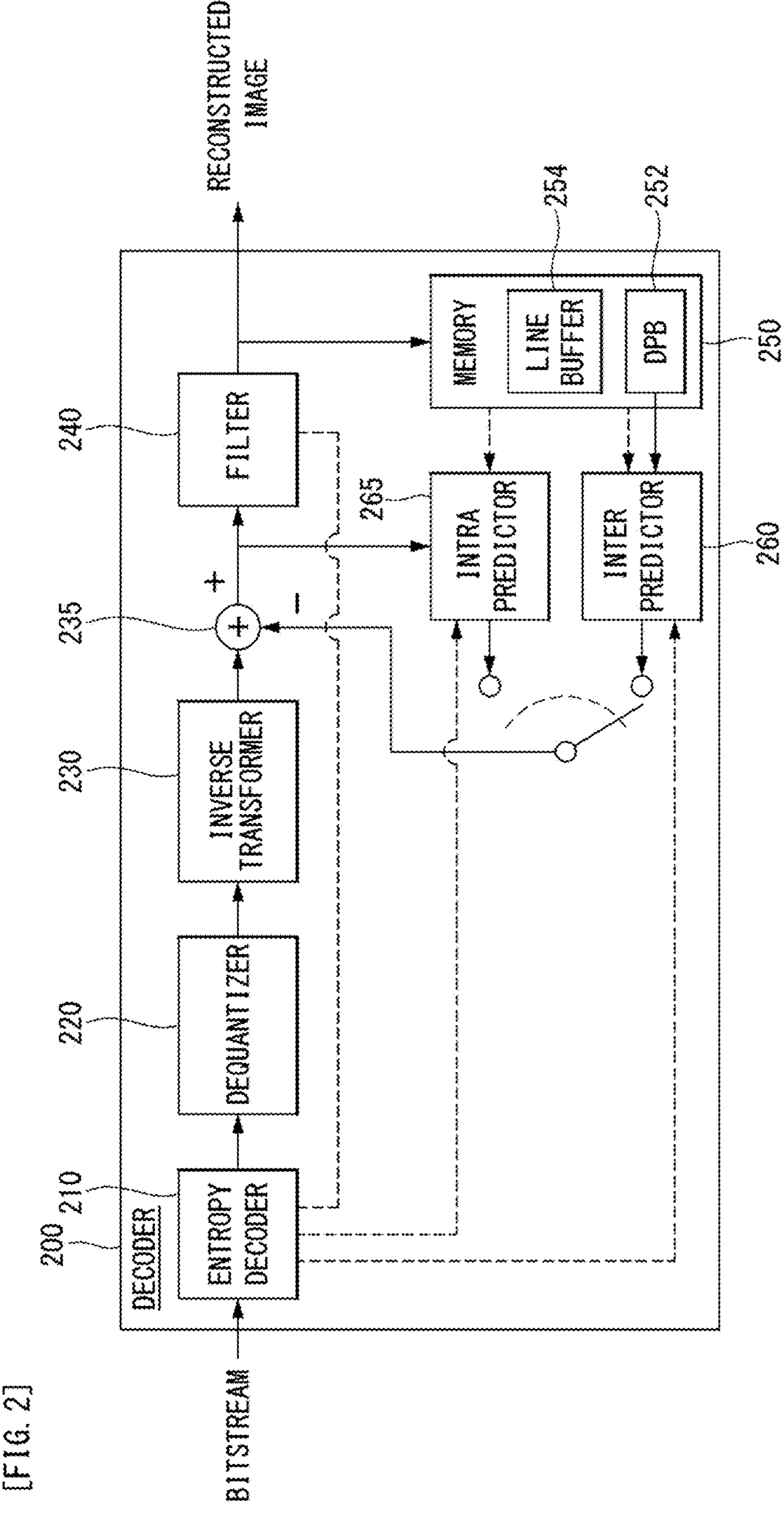
[FIG. 2]
BITSTREAM
DECODER
200
210
ENTROPY DECODER
220
DEQUANTIZER
230
INVERSE TRANSFORMER
235
240
FILTER
RECONSTRUCTED IMAGE
MEMORY
LINE BUFFER
DPB
254
252
250
265
INTRA PREDICTOR
INTER PREDICTOR
260

[FIG. 3]

SPLIT_BT_VER SPLIT_BT_HOR SPLIT_TT_VER SPLIT_TT_HOR

[FIG. 4]
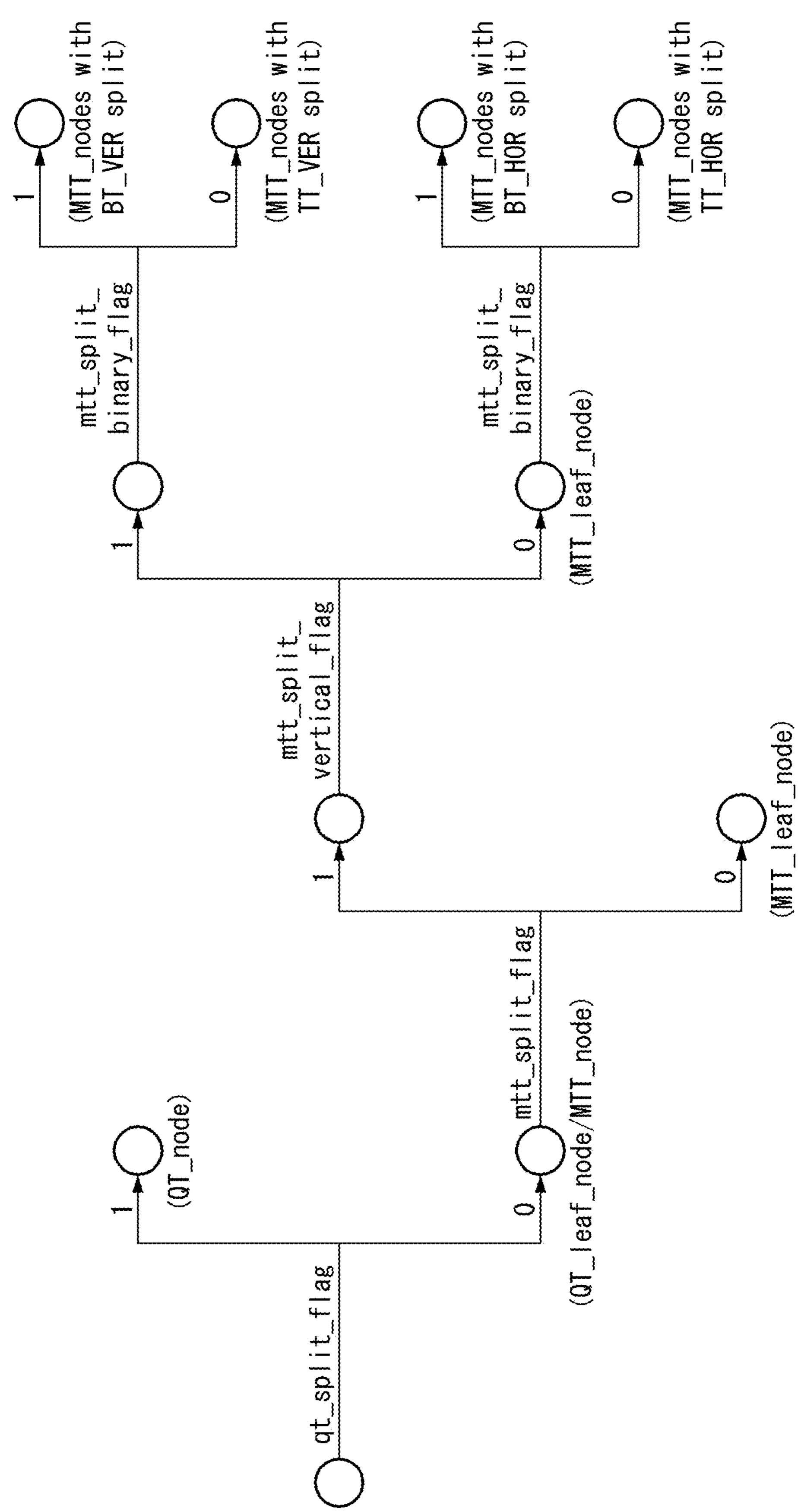

[FIG. 5]
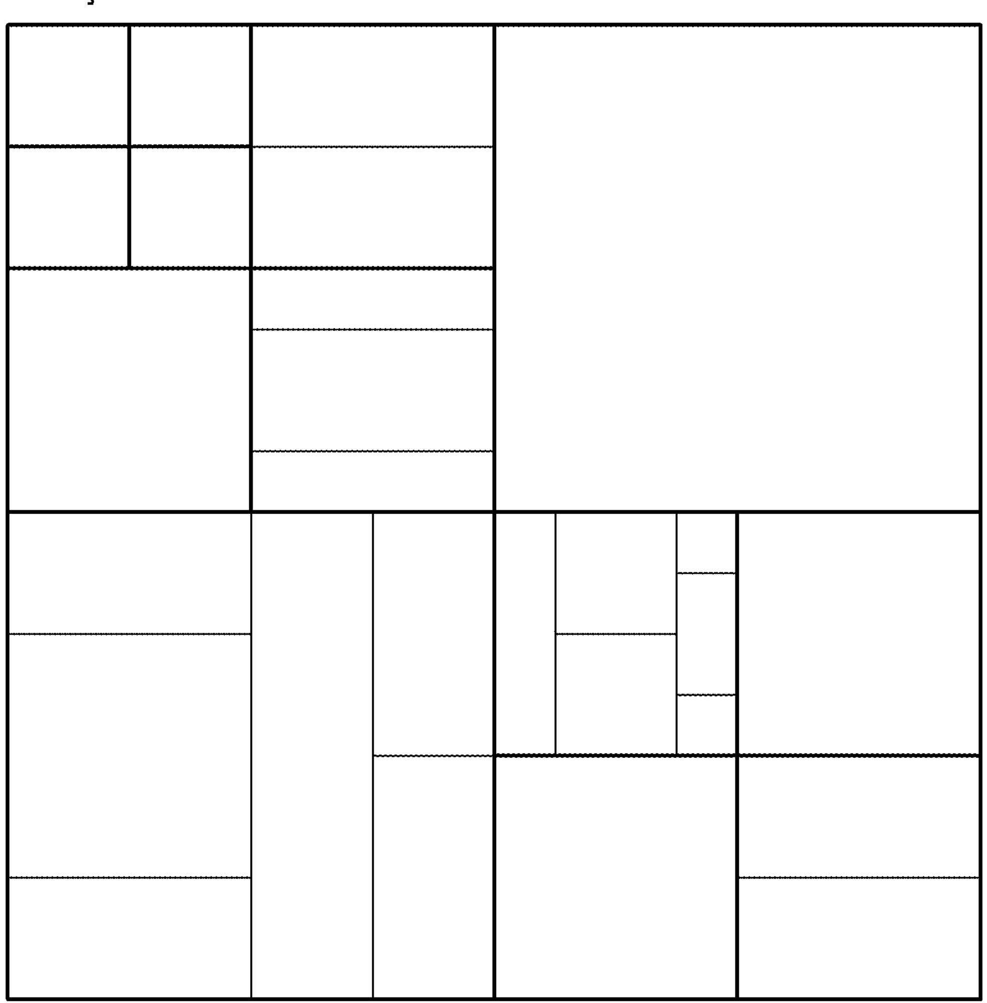

[FIG. 6]
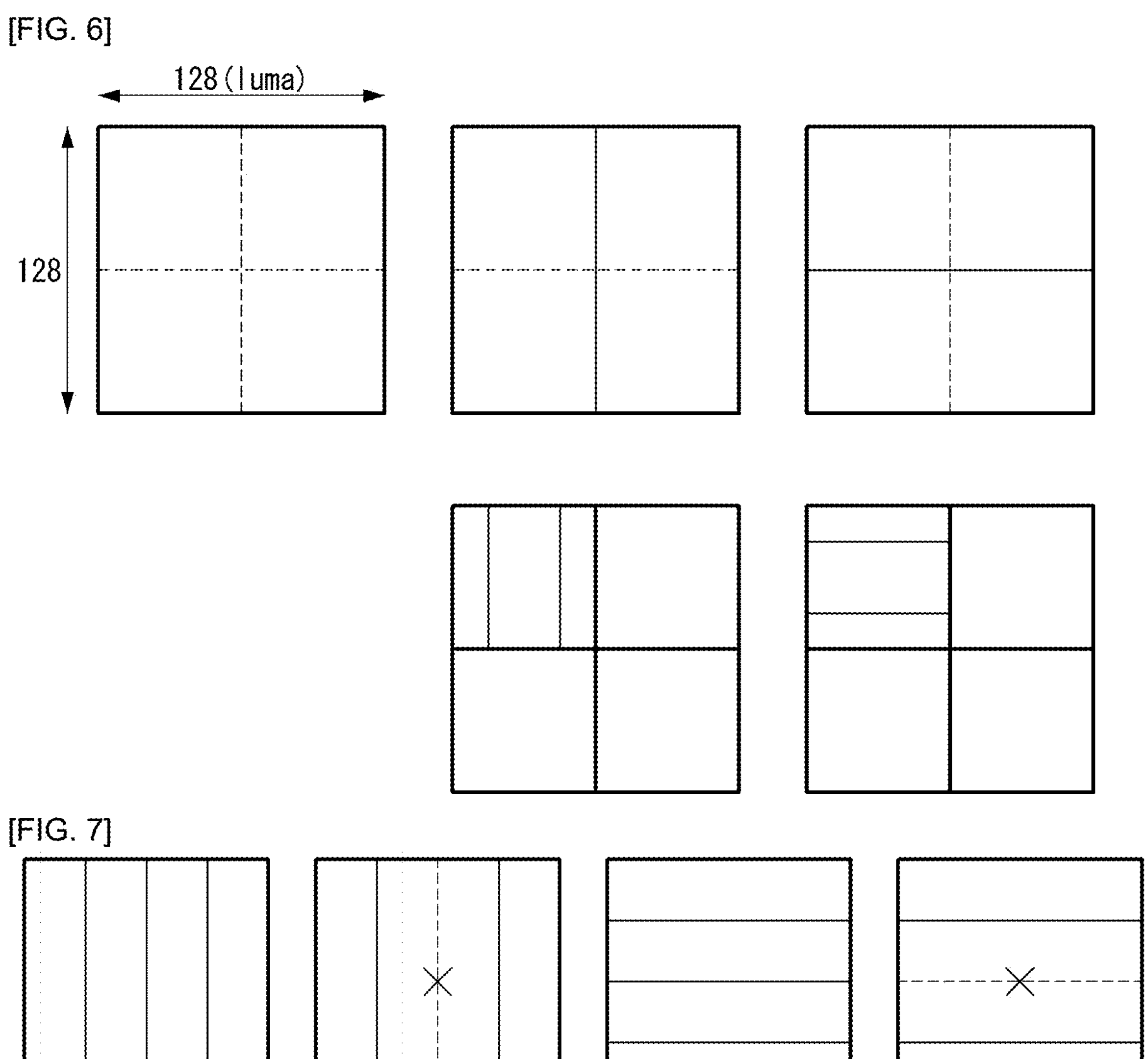
[FIG. 7]

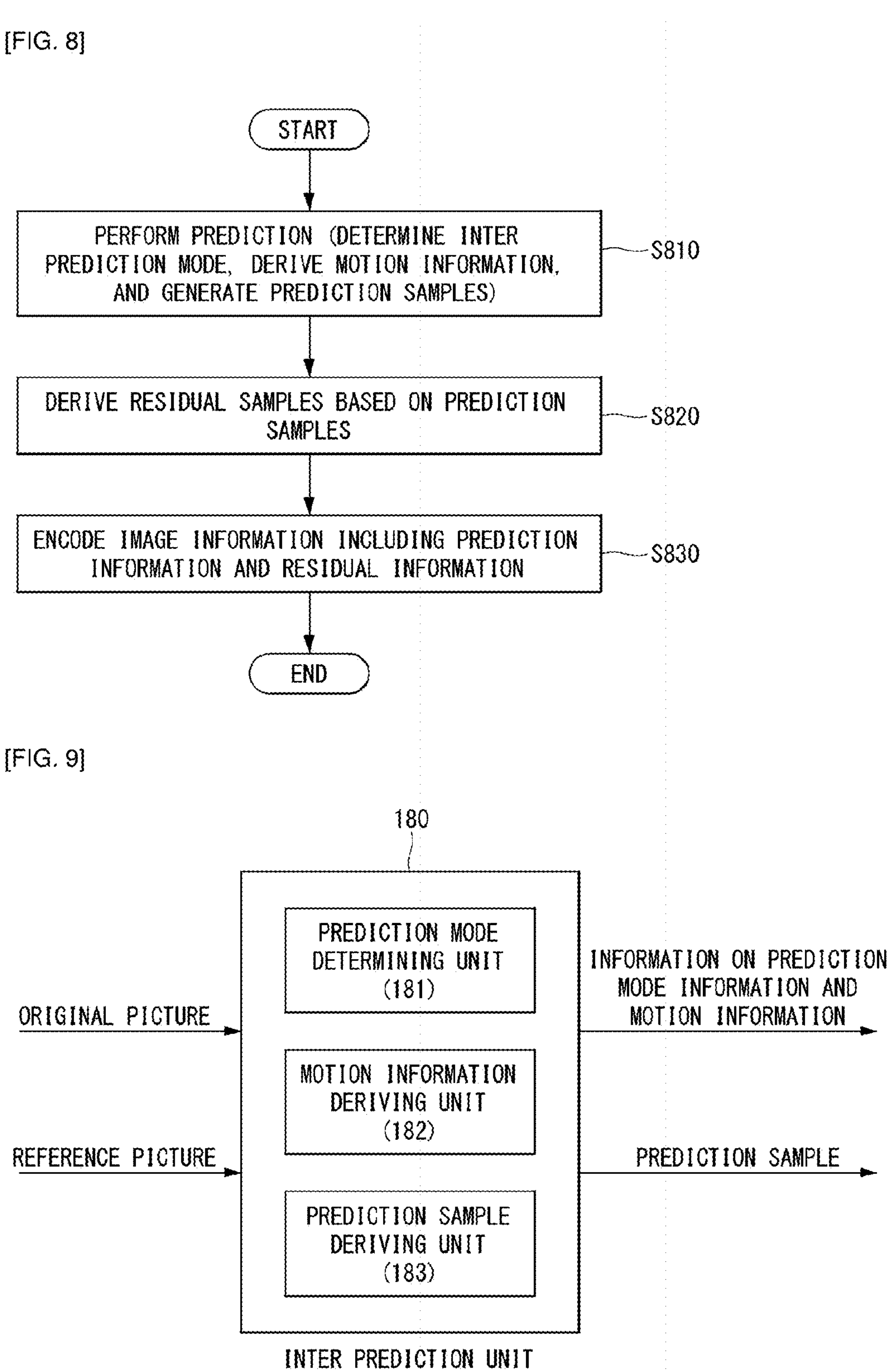
[FIG. 8]
START
PERFORM PREDICTION (DETERMINE INTER PREDICTION MODE, DERIVE MOTION INFORMATION, AND GENERATE PREDICTION SAMPLES)
S810
DERIVE RESIDUAL SAMPLES BASED ON PREDICTION SAMPLES
S820
ENCODE IMAGE INFORMATION INCLUDING PREDICTION INFORMATION AND RESIDUAL INFORMATION
S830
END
[FIG. 9]
180
PREDICTION MODE DETERMINING UNIT (181)
MOTION INFORMATION DERIVING UNIT (182)
PREDICTION SAMPLE DERIVING UNIT (183)
ORIGINAL PICTURE
REFERENCE PICTURE
INFORMATION ON PREDICTION MODE INFORMATION AND MOTION INFORMATION
PREDICTION SAMPLE
INTER PREDICTION UNIT

[FIG. 10]
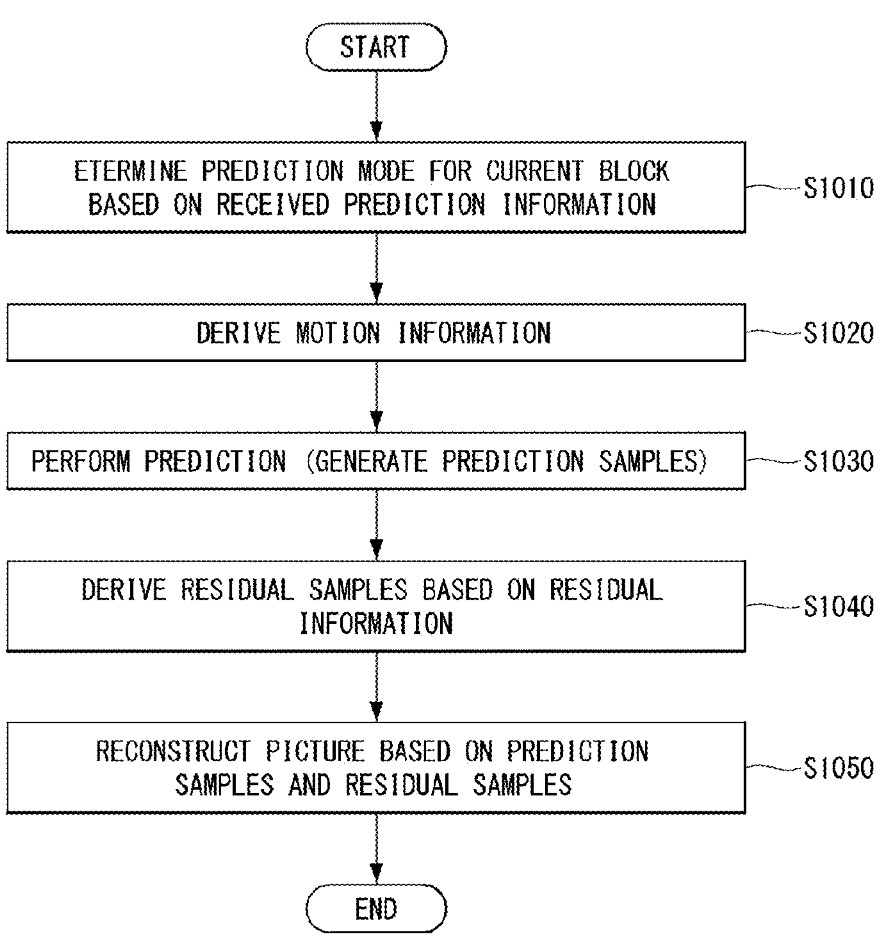

[FIG. 11]
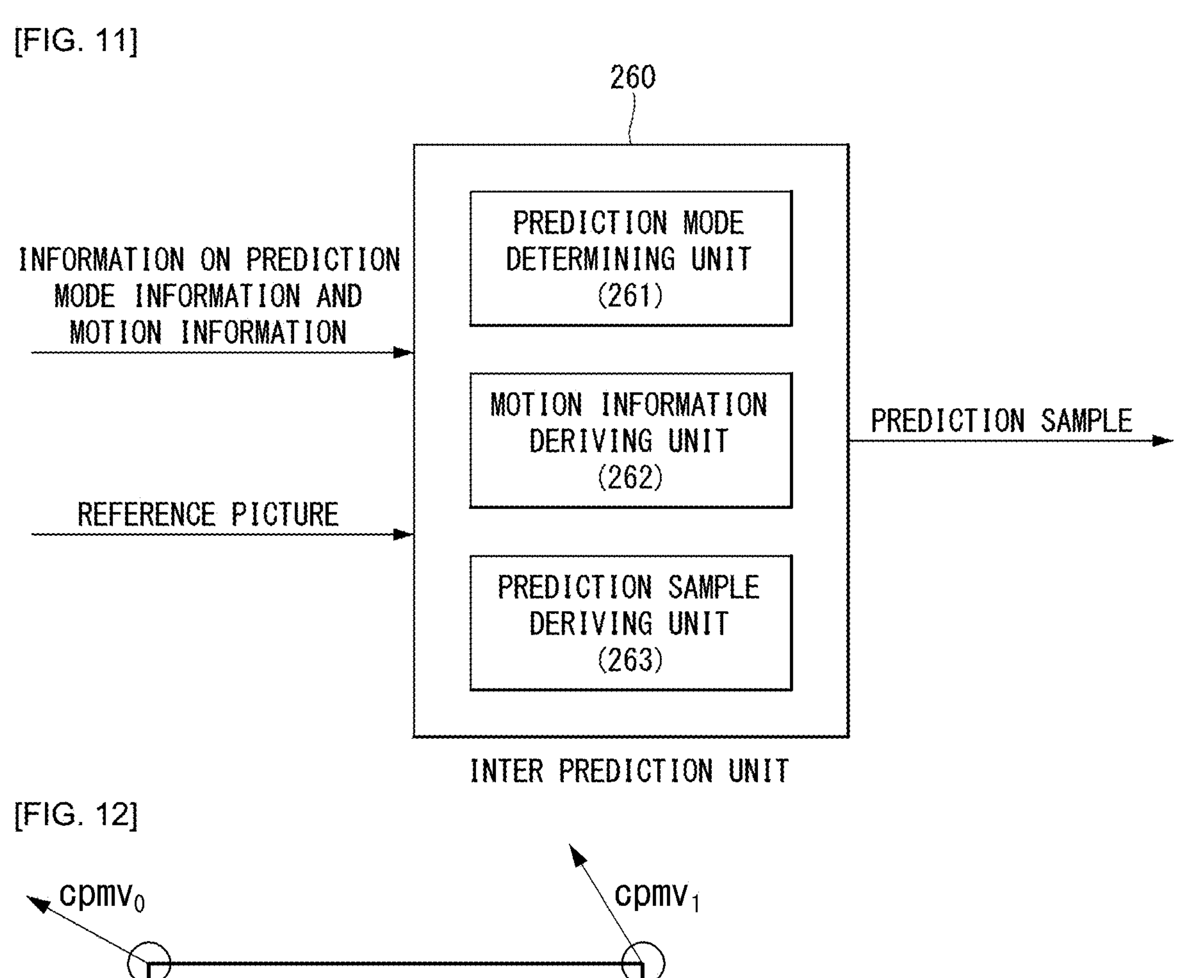
[FIG. 12]

[FIG. 13]
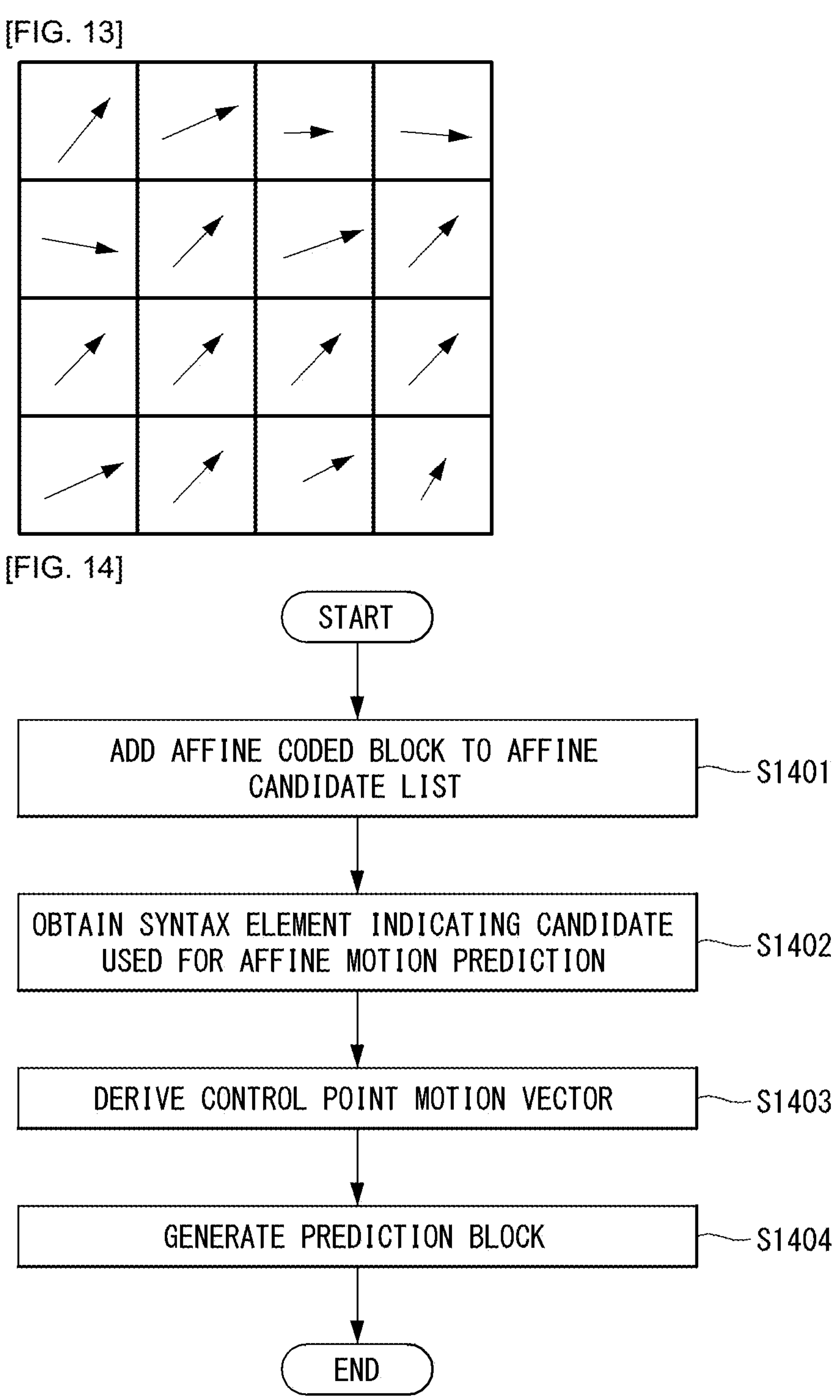

[FIG. 15]
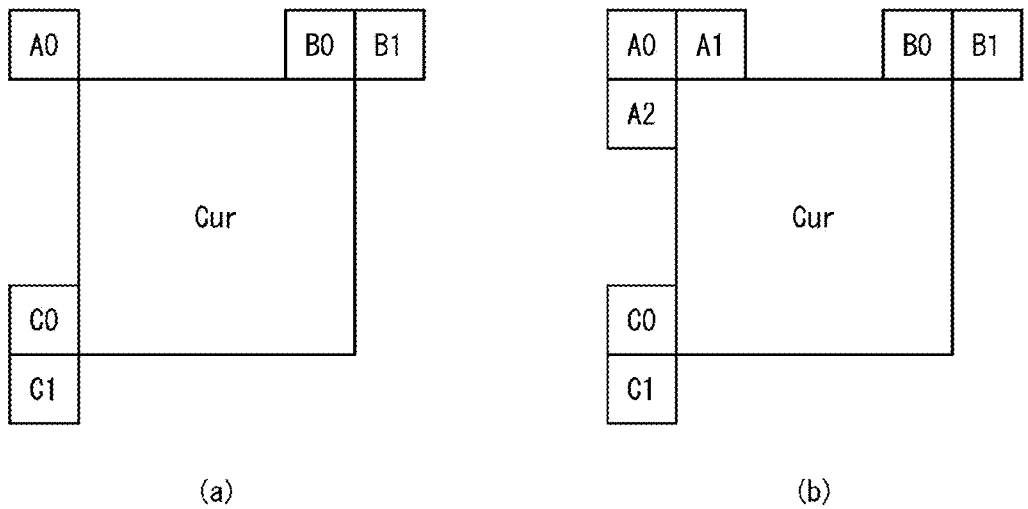
[FIG. 16]
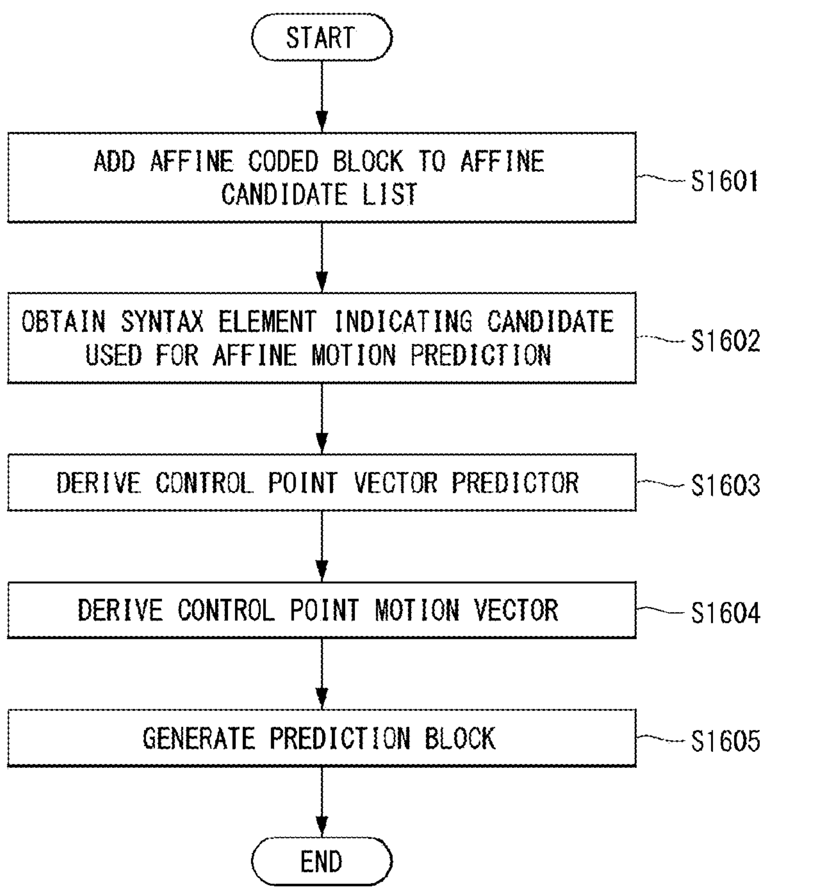

[FIG. 17]
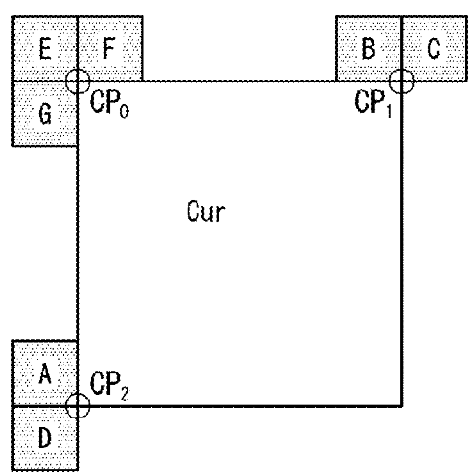
[FIG. 18]
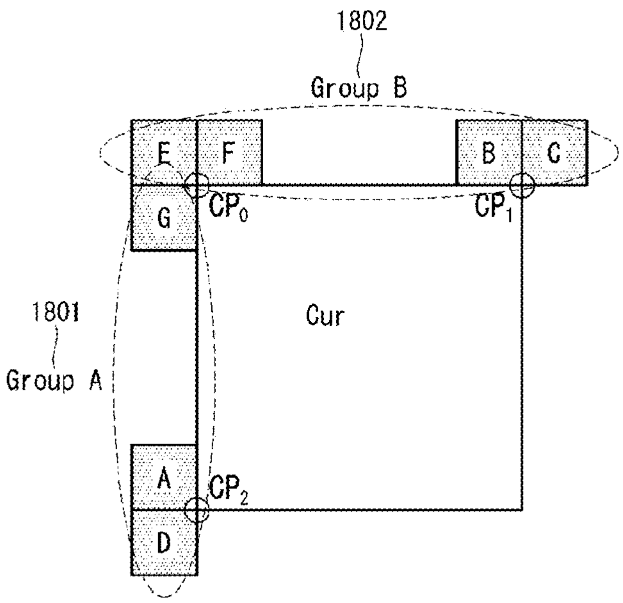

[FIG. 19]
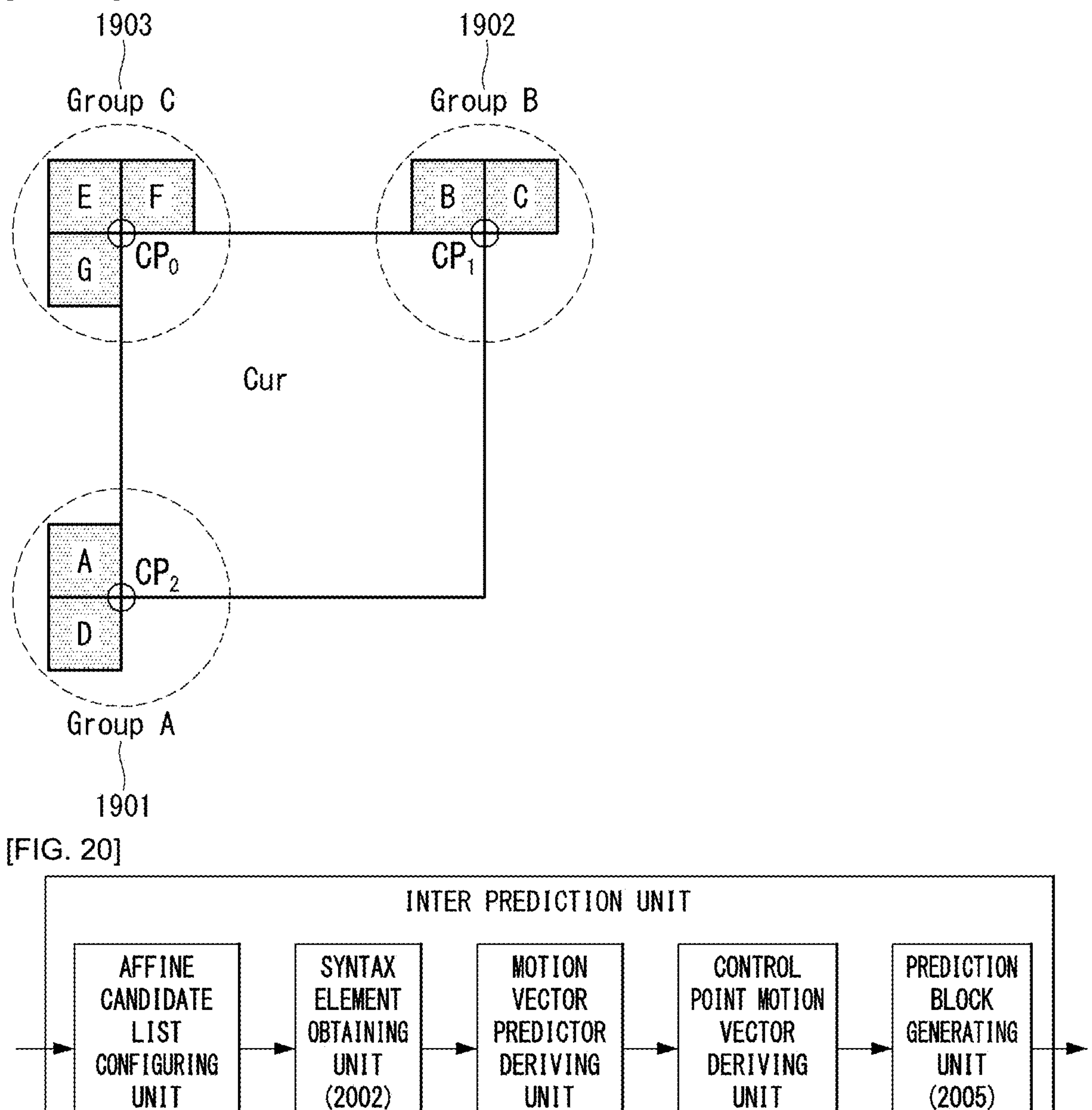
[FIG. 20]

[FIG. 21]
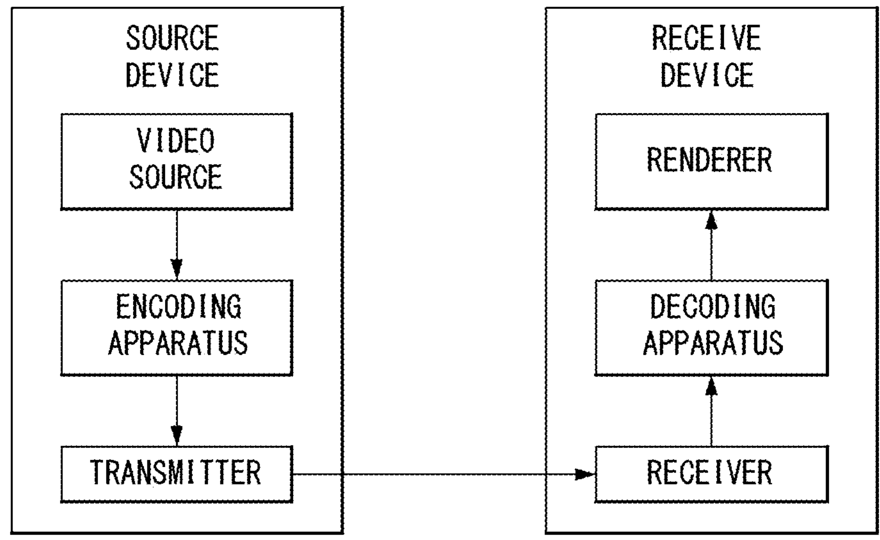
[FIG. 22]
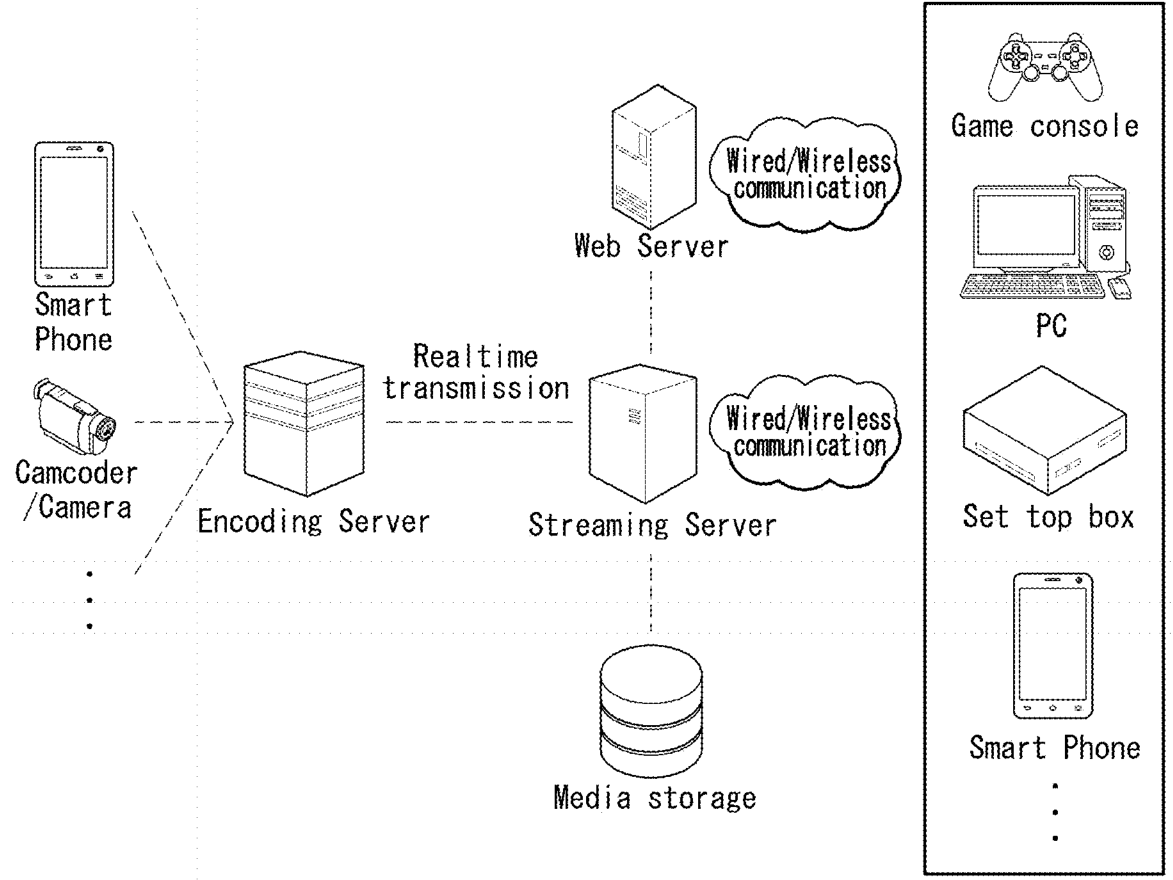

METHOD AND DEVICE FOR PROCESSING VIDEO SIGNAL BY USING AFFINE MOTION PREDICTION

CROSS-REFERENCE TO RELATED APPLICATIONS

This application is a Continuation application of U.S. patent application Ser. No. 18/224,967, filed Jul. 21, 2023, which is a Continuation application of U.S. patent application Ser. No. 17/831,119, filed Jun. 2, 2022, now patented as U.S. Pat. No. 11,758,170, issued Aug. 23, 2023, which is a Continuation application of U.S. patent application Ser. No. 15/734,362, filed on Dec. 2, 2020, now allowed, which is a National Stage filing under 35 U.S.C. 371 of International Application No. PCT/KR2019/006749, filed on Jun. 4, 2019, which claims the benefit of Korean Application No. 10-2018-0064187, filed on Jun. 4, 2018, the contents of which are all hereby incorporated by reference herein in their entirety.

TECHNICAL FIELD

The present disclosure relates to a method for processing a video signal using affine motion prediction and an apparatus thereof, and more particularly, to a method and an apparatus for performing affine motion prediction based on a neighbor affine coded block.

BACKGROUND ART

Compression encoding means a series of signal processing techniques for transmitting digitized information through a communication line or techniques for storing information in a form suitable for a storage medium. The medium including a picture, an image, audio, etc. may be a target for compression encoding, and particularly, a technique for performing compression encoding on a picture is referred to as video image compression.

Next-generation video contents are supposed to have the characteristics of high spatial resolution, a high frame rate and high dimensionality of scene representation. In order to process such contents, a drastic increase in the memory storage, memory access rate and processing power will result.

Accordingly, it is required to design a coding tool for processing next-generation video contents efficiently.

DISCLOSURE

Technical Problem

An embodiment of the present disclosure provides a method for performing affine motion prediction using an affine motion model of a neighbor block coded by affine prediction.

Furthermore, an embodiment of the present disclosure provides a method for performing affine motion prediction using an inherited affine candidate.

Furthermore, an embodiment of the present disclosure provides a method for deriving an affine candidate used for affine motion prediction using a neighbor block coded by affine prediction.

Furthermore, an embodiment of the present disclosure provides a method for selecting an affine candidate used for affine motion prediction in a neighbor block.

The technical objects of the present disclosure are not limited to the aforementioned technical objects, and other technical objects, which are not mentioned above, will be apparently appreciated by a person having ordinary skill in the art from the following description.

Technical Solution

In an aspect, provided is a method for decoding a video signal by using an affine motion prediction, which may include: adding, to an affine candidate list, an affine coded block coded in an affine prediction mode among neighbor blocks of a current block; obtaining a syntax element indicating a candidate used for the affine motion prediction of the current block in the affine candidate list; deriving a control point motion vector predictor of the current block based on an affine motion model of the candidate indicated by the syntax element; deriving a control point motion vector of the current block by adding a control point motion vector difference to the control point motion vector predictor; and generating a prediction block of the current block by using the control point motion vector of the current block, in which the affine coded block added to the affine candidate list may have the same reference picture as a reference picture of the current block.

Preferably, the adding of the affine coded block to the affine candidate list may further include grouping the neighbor blocks of the current block into a plurality of groups, and searching the affine coded block according to a predefined order in each of the plurality of groups.

Preferably, the neighbor blocks of the current block may be grouped into a left group and a top group.

Preferably, the adding of the affine coded block to the affine candidate list may be performed by adding a predefined maximum number of affine coded blocks to the affine candidate list, and the predefined maximum number may be two.

Preferably, the adding of the affine coded block to the affine candidate list may include searching a valid affine coded block among the blocks having the same reference picture as the reference picture of the current block in the left group according to a predefined order, and searching a valid affine coded block among the blocks having the same reference picture as the reference picture of the current block in the top group according to a predefined order.

Preferably, the adding of the affine coded block to the affine candidate list may further include adding, to the affine candidate list, an affine candidate scaled based on a picture order count between reference pictures when there is no affine coded block among the neighbor blocks of the current block.

In another aspect, provided is an apparatus for decoding a video signal by using an affine motion prediction, which may include: an affine candidate list configuring unit adding, to an affine candidate list, an affine coded block coded in an affine prediction mode among neighbor blocks of a current block; a syntax element obtaining unit obtaining a syntax element indicating a candidate used for the affine motion prediction of the current block in the affine candidate list; a motion vector predictor deriving unit deriving a control point motion vector predictor of the current block based on an affine motion model of the candidate indicated by the syntax element; a control point motion vector deriving unit deriving a control point motion vector of the current block by adding a control point motion vector difference to the control point motion vector predictor; and a prediction block generating unit generating a prediction block of the current block by using the control point motion vector of the current block, in which the affine coded block added to the affine candidate list may have the same reference picture as a reference picture of the current block.

Preferably, the affine candidate list configuring unit may group the neighbor blocks of the current block into a plurality of groups, and search the affine coded block according to a predefined order in each of the plurality of groups.

Preferably, the neighbor blocks of the current block may be grouped into a left group and a top group.

Preferably, the affine candidate list configuring unit may add a predefined maximum number of affine coded blocks to the affine candidate list, and the predefined maximum number may be two.

Preferably, the affine candidate list configuring unit may search a valid affine coded block among the blocks having the same reference picture as the reference picture of the current block in the left group according to a predefined order, and search a valid affine coded block among the blocks having the same reference picture as the reference picture of the current block in the top group according to a predefined order.

Preferably, the affine candidate list configuring unit may add, to the affine candidate list, an affine candidate scaled based on a picture order count between reference pictures when there is no affine coded block among the neighbor blocks of the current block.

Advantageous Effects

According to an embodiment of the present disclosure, an affine candidate is efficiently configured using a neighbor block coded by affine prediction to increase accuracy of the affine prediction and enhance compression performance.

Effects obtainable in the present disclosure are not limited to the aforementioned effects and other unmentioned effects will be clearly understood by those skilled in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

FIG. 1 illustrates an example a function configuration of an encoder as one example of a video signal processing apparatus according to an embodiment of the present disclosure.

FIG. 2 illustrates an example a function configuration of a decoder as another example of a video signal processing apparatus according to an embodiment of the present disclosure.

FIG. 3 illustrates one example of a multi-type tree structure according to an embodiment of the present disclosure.

FIG. 4 illustrates an example of a signaling mechanism of partitioning information of a quadtree with nested multi-type tree structure according to an embodiment of the present disclosure.

FIG. 5 illustrates a method for a method for splitting a coding tree unit (CTU) into multiple CUs based on a quadtree and nested multi-type tree structure according to an embodiment of the present disclosure.

FIG. 6 illustrates an example of a method for limiting ternary-tree splitting according to an embodiment of the present disclosure.

FIG. 7 illustrates an example of redundant partitioning patterns which may occur in binary-tree partitioning and ternary-tree partitioning according to an embodiment of the present disclosure.

FIG. 8 illustrates an example of an operation flowchart for image encoding in a video signal processing method according to an embodiment of the present disclosure.

FIG. 9 illustrates an example a function configuration of an inter-prediction unit of an encoder in a video signal processing apparatus according to an embodiment of the present disclosure.

FIG. 10 illustrates an example of an operation flowchart for image decoding in a video signal processing method according to an embodiment of the present disclosure.

FIG. 11 illustrates an example a function configuration of an inter-prediction unit of a decoder in a video signal processing apparatus according to an embodiment of the present disclosure.

FIG. 12 illustrates an example of a motion model of an affine motion prediction technique according to an embodiment of the present disclosure.

FIG. 13 illustrates an example of a motion vector field for each subblock in a coding block to which an affine motion prediction technique is applied according to an embodiment of the present disclosure.

FIG. 14 is a diagram illustrating a method for performing affine motion prediction using a neighbor affine coded block as an embodiment to which the present disclosure is applied.

FIG. 15 illustrates an example of neighbor blocks used for affine motion prediction as an embodiment to which the present disclosure is applied.

FIG. 16 is a diagram illustrating a method for performing affine motion prediction using a neighbor affine coded block as an embodiment to which the present disclosure is applied.

FIG. 17 illustrates an example of neighbor blocks used for affine motion prediction as an embodiment to which the present disclosure is applied.

FIG. 18 is a diagram illustrating a method for grouping neighbor blocks used for affine motion prediction according to an embodiment to which the present disclosure is applied.

FIG. 19 is a diagram illustrating a method for grouping neighbor blocks used for affine motion prediction according to an embodiment to which the present disclosure is applied.

FIG. 20 is a diagram illustrating an inter prediction device according to an embodiment to which the present disclosure is applied.

FIG. 21 illustrates an example of a video coding system as an embodiment to which the present disclosure is applied.

FIG. 22 illustrates an example of a video streaming system as an embodiment to which the present disclosure is applied.

MODE FOR INVENTION

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure.

However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

Although most terms used in the present disclosure have been selected from general ones widely used in the art, some terms have been arbitrarily selected by the applicant and their meanings are explained in detail in the following description as needed. Thus, the present disclosure should be understood with the intended meanings of the terms rather than their simple names or meanings.

Specific terms used in the following description have been provided to help understanding of the present disclosure, and the use of such specific terms may be changed in various forms without departing from the technical sprit of the present disclosure. For example, signals, data, samples, pictures, frames, blocks and the like may be appropriately replaced and interpreted in each coding process.

In the present description, a "processing unit" refers to a unit in which an encoding/decoding process such as prediction, transform and/or quantization is performed. Further, the processing unit may be interpreted into the meaning including a unit for a luma component and a unit for a chroma component. For example, the processing unit may correspond to a coding tree unit (CTU), a coding unit (CU), a prediction unit (PU) or a transform unit (TU).

In addition, the processing unit may be interpreted into a unit for a luma component or a unit for a chroma component. For example, the processing unit may correspond to a coding tree block (CTB), a coding block (CB), a prediction unit PU or a transform block (TB) for the luma component. Further, the processing unit may correspond to a CTB, a CB, a PU or a TB for the chroma component. Moreover, the processing unit is not limited thereto and may be interpreted into the meaning including a unit for the luma component and a unit for the chroma component.

In addition, the processing unit is not necessarily limited to a square block and may be configured as a polygonal shape having three or more vertexes.

Furthermore, in the present description, a pixel is called a sample. In addition, using a sample may mean using a pixel value or the like.

FIG. 1 is a schematic block diagram of an encoding apparatus which encodes a video/image signal as an embodiment to which the present disclosure is applied.

Referring to FIG. 1, an encoding apparatus 100 may be configured to include an image divider 110, a subtractor 115, a transformer 120, a quantizer 130, a dequantizer 140, an inverse transformer 150, an adder 155, a filter 160, a memory 170, an inter predictor 180, an intra predictor 185 and an entropy encoder 190. The inter predictor 180 and the intra predictor 185 may be commonly called a predictor. In other words, the predictor may include the inter predictor 180 and the intra predictor 185. The transformer 120, the quantizer 130, the dequantizer 140, and the inverse transformer 150 may be included in a residual processor. The residual processor may further include the subtractor 115. In one embodiment, the image divider 110, the subtractor 115, the transformer 120, the quantizer 130, the dequantizer 140, the inverse transformer 150, the adder 155, the filter 160, the inter predictor 180, the intra predictor 185 and the entropy encoder 190 may be configured as one hardware component (e.g., an encoder or a processor). Furthermore, the memory 170 may include a decoded picture buffer (DPB) 172 and a line buffer 174, and may be implemented by a digital storage medium.

The image divider 110 may divide an input image (or picture or frame), input to the encoding apparatus 100, into one or more processing units. For example, the processing unit may be called a coding unit (CU). In this case, the coding unit may be recursively split from a coding tree unit (CTU) or the largest coding unit (LCU) based on a quadtree binary-tree (QTBT) structure. For example, one coding unit may be split into a plurality of coding units of a deeper depth based on a quadtree structure and/or a binary-tree structure. In this case, for example, the quadtree structure may be first applied, and the binary-tree structure may be then applied. Alternatively the binary-tree structure may be first applied. A coding procedure according to the disclosure may be performed based on the final coding unit that is no longer split. In this case, the largest coding unit may be directly used as the final coding unit based on coding efficiency according to an image characteristic or a coding unit may be recursively split into coding units of a deeper depth, if necessary. Accordingly, a coding unit having an optimal size may be used as the final coding unit. In this case, the coding procedure may include a procedure, such as a prediction, transform or reconstruction to be described later. For another example, the processing unit may further include a prediction unit (PU) or a transform unit (TU). In this case, each of the prediction unit and the transform unit may be divided or partitioned from each final coding unit. The prediction unit may be a unit for sample prediction, and the transform unit may be a unit from which a transform coefficient is derived and/or a unit in which a residual signal is derived from a transform coefficient.

A unit may be interchangeably used with a block or an area according to circumstances. In a common case, an M×N block may indicate a set of samples configured with M columns and N rows or a set of transform coefficients. In general, a sample may indicate a pixel or a value of a pixel, and may indicate only a pixel/pixel value of a luma component or only a pixel/pixel value of a chroma component. In a sample, one picture (or image) may be used as a term corresponding to a pixel or pel.

The encoding apparatus 100 may generate a residual signal (residual block or residual sample array) by subtracting a prediction signal (predicted block or prediction sample array), output by the inter predictor 180 or the intra predictor 185, from an input image signal (original block or original sample array). The generated residual signal is transmitted to the transformer 120. In this case, as illustrated, a unit in which the prediction signal (prediction block or prediction sample array) is subtracted from the input image signal (original block or original sample array) within the encoding apparatus 100 may be called the subtractor 115. The predictor may perform prediction on a processing target block (hereinafter referred to as a current block), and may generate a predicted block including prediction samples for the current block. The predictor may determine whether an intra prediction is applied or inter prediction is applied in a current block or a CU unit. The predictor may generate various pieces of information on a prediction, such as prediction mode information as will be described later in the description of each prediction mode, and may transmit the information to the entropy encoder 190. The information on prediction may be encoded in the entropy encoder 190 and may be output in a bitstream form.

The intra predictor 185 may predict a current block with reference to samples within a current picture. The referred samples may be located to neighbor the current block or may be spaced from the current block depending on a prediction mode. In an intra prediction, prediction modes may include a plurality of non-angular modes and a plurality of angular modes. The non-angular mode may include a DC mode and a planar mode, for example. The angular mode may include 33 angular prediction modes or 65 angular prediction modes, for example, depending on a fine degree of a prediction direction. In this case, angular prediction modes that are more or less than the 33 angular prediction modes or 65 angular prediction modes may be used depending on a configuration, for example. The intra predictor 185 may determine a prediction mode applied to a current block using the prediction mode applied to a neighboring block.

The inter predictor 180 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. A reference picture including a reference block and a reference picture including a temporal neighboring block may be the same or different. The temporal neighboring block may be referred to as a name called a co-located reference block or a co-located CU (colCU). A reference picture including a temporal neighboring block may be referred to as a co-located picture (colPic). For example, the inter predictor 180 may construct a motion information candidate list based on neighboring blocks, and may generate information indicating that which candidate is used to derive a motion vector and/or reference picture index of a current block. An inter prediction may be performed based on various prediction modes. For example, in the case of a skip mode and a merge mode, the inter predictor 180 may use motion information of a neighboring block as motion information of a current block. In the case of the skip mode, unlike the merge mode, a residual signal may not be transmitted. In the case of a motion vector prediction (MVP) mode, a motion vector of a neighboring block may be used as a motion vector predictor. A motion vector of a current block may be indicated by signaling a motion vector difference (MVD).

A prediction signal generated through the inter predictor 180 or the intra predictor 185 may be used to generate a reconstructed signal or a residual signal.

The transformer 120 may generate transform coefficients by applying a transform scheme to a residual signal. For example, the transform scheme may include at least one of a discrete cosine transform (DCT), a discrete sine transform (DST), a Karhunen-Loève transform (KLT), a graph-based transform (GBT), or a conditionally non-linear transform (CNT). In this case, the GBT means a transform obtained from a graph if relation information between pixels is represented as the graph. The CNT means a transform obtained based on a prediction signal generated u sing all of previously reconstructed pixels. Furthermore, a transform process may be applied to pixel blocks having the same size of a square form or may be applied to blocks having variable sizes not a square form.

The quantizer 130 may quantize transform coefficients and transmit them to the entropy encoder 190. The entropy encoder 190 may encode a quantized signal (information on quantized transform coefficients) and output it in a bitstream form. The information on quantized transform coefficients may be called residual information. The quantizer 130 may re-arrange the quantized transform coefficients of a block form in one-dimensional vector form based on various scan sequences, and may generate information on the quantized transform coefficients based on the quantized transform coefficients of the one-dimensional vector form. The entropy encoder 190 may perform various encoding methods, such as exponential Golomb, context-adaptive variable length coding (CAVLC), and context-adaptive binary arithmetic coding (CABAC). The entropy encoder 190 may encode information (e.g., values of syntax elements) necessary for video/image reconstruction in addition to the quantized transform coefficients together or separately. The encoded information (e.g., encoded video/image information) may be transmitted or stored in a network abstraction layer (NAL) unit in the form of a bitstream. The bitstream may be transmitted over a network or may be stored in a digital storage medium. In this case, the network may include a broadcast network and/or a communication network. The digital storage medium may include various storage media, such as a USB, an SD, a CD, a DVD, Blueray, an HDD, and an SSD. A transmitter (not illustrated) that transmits a signal output by the entropy encoder 190 and/or a storage (not illustrated) for storing the signal may be configured as an internal/external element of the encoding apparatus 100, or the transmitter may be an element of the entropy encoder 190.

Quantized transform coefficients output by the quantizer 130 may be used to generate a prediction signal. For example, a residual signal may be reconstructed by applying de-quantization and an inverse transform to the quantized transform coefficients through the dequantizer 140 and the inverse transformer 150 within a loop. The adder 155 may add the reconstructed residual signal to a prediction signal output by the inter predictor 180 or the intra predictor 185, so a reconstructed signal (reconstructed picture, reconstructed block or reconstructed sample array) may be generated. A predicted block may be used as a reconstructed block if there is no residual for a processing target block as in the case where a skip mode has been applied. The adder 155 may be called a reconstructor or a reconstruction block generator. The generated reconstructed signal may be used for the intra prediction of a next processing target block within a current picture, and may be used for the inter prediction of a next picture through filtering as will be described later.

The filter 160 can improve subjective/objective picture quality by applying filtering to a reconstructed signal. For example, the filter 160 may generate a modified reconstructed picture by applying various filtering methods to the reconstructed picture. The modified reconstructed picture may be stored in the memory 170, more particularly in the DPB 172 of the memory 170. The various filtering methods may include deblocking filtering, a sample adaptive offset SAO, an adaptive loop filter ALF, and a bilateral filter, for example. The filter 160 may generate various pieces of information for filtering as will be described later in the description of each filtering method, and may transmit them to the entropy encoder 190. The filtering information may be encoded by the entropy encoder 190 and output in a bitstream form.

The modified reconstructed picture transmitted to the memory 170 may be used as a reference picture in the inter predictor 180. The encoding apparatus can avoid a prediction mismatch in the encoding apparatus 100 and a decoding apparatus and improve encoding efficiency if inter prediction is applied.

The DPB 172 of the memory 170 may store the modified reconstructed picture to use it as a reference picture in the inter predictor 180. The memory 170 may store motion information of a block in which the motion information in the current picture is derived (or encoded) and/or motion information of blocks in an already reconstructed picture. The stored motion information may be forwarded to the inter predictor 180 to be utilized as motion information of a spatial neighboring block or motion information of a temporal neighboring block. The memory 170 may store reconstructed samples of the reconstructed blocks in the current picture and forward it to the intra predictor 185.

The line buffer 174 of the memory 170 may store information on samples of the corresponding line for each line of the picture, the frame, the slice, the tile, or the brick of a video signal to be encoded. For example, the line buffer 174 may include information on luma values, chroma values, prediction modes, or prediction vectors of samples of each line. The line buffer 174 may be constituted by a plurality of storage memories for each line. Further, unlike FIG. 1, the line buffer 174 may be constituted as a part of a memory (not illustrated) configured outside the decoder.

FIG. 2 is an embodiment to which the disclosure is applied, and is a schematic block diagram of a decoding apparatus for decoding a video/image signal.

Referring to FIG. 2, the decoding apparatus 200 may be configured to include an entropy decoder 210, a dequantizer 220, an inverse transformer 230, an adder 235, a filter 240, a memory 250, an inter predictor 260 and an intra predictor 265. The inter predictor 260 and the intra predictor 265 may be collectively called a predictor. That is, the predictor may include the inter predictor 180 and the intra predictor 185. The dequantizer 220 and the inverse transformer 230 may be collectively called as residual processor. That is, the residual processor may include the dequantizer 220 and the inverse transformer 230. The entropy decoder 210, the dequantizer 220, the inverse transformer 230, the adder 235, the filter 240, the inter predictor 260 and the intra predictor 265 may be configured as one hardware component (e.g., the decoder or the processor) according to an embodiment. Furthermore, the memory 250 may include a decoded picture buffer (DPB) 252 and a line buffer 254, and may be implemented by a digital storage medium.

When a bitstream including video/image information is input, the decoding apparatus 200 may reconstruct an image in accordance with a process of processing video/image information in the encoding apparatus of FIG. 1. For example, the decoding apparatus 200 may perform decoding using a processing unit applied in the encoding apparatus. Accordingly, a processing unit for decoding may be a coding unit, for example. The coding unit may be split from a coding tree unit or the largest coding unit depending on a quadtree structure and/or a binary-tree structure. Furthermore, a reconstructed image signal decoded and output through the decoding apparatus 200 may be played back through a playback device.

The decoding apparatus 200 may receive a signal, output by the encoding apparatus of FIG. 1, in a bitstream form. The received signal may be decoded through the entropy decoder 210. For example, the entropy decoder 210 may derive information (e.g., video/image information) for image reconstruction (or picture reconstruction) by parsing the bitstream. For example, the entropy decoder 210 may decode information within the bitstream based on a coding method, such as exponential Golomb encoding, CAVLC or CABAC, and may output a value of a syntax element for image reconstruction or quantized values of transform coefficients regarding a residual. More specifically, in the CABAC entropy decoding method, a bin corresponding to each syntax element may be received from a bitstream, a context model may be determined using decoding target syntax element information and decoding information of a neighboring and decoding target block or information of a symbol/bin decoded in a previous step, a probability that a bin occurs may be predicted based on the determined context model, and a symbol corresponding to a value of each syntax element may be generated by performing arithmetic decoding on the bin. In this case, in the CABAC entropy decoding method, after a context model is determined, the context model may be updated using information of a symbol/bin decoded for the context model of a next symbol/bin. Information on a prediction among information decoded in the entropy decoder 2110 may be provided to the predictor (inter predictor 260 and intra predictor 265). Parameter information related to a residual value on which entropy decoding has been performed in the entropy decoder 210, that is, quantized transform coefficients, may be input to the dequantizer 220. Furthermore, information on filtering among information decoded in the entropy decoder 210 may be provided to the filter 240. Meanwhile, a receiver (not illustrated) that receives a signal output by the encoding apparatus may be further configured as an internal/external element of the decoding apparatus 200 or the receiver may be an element of the entropy decoder 210.

The dequantizer 220 may de-quantize quantized transform coefficients and output transform coefficients. The dequantizer 220 may re-arrange the quantized transform coefficients in a two-dimensional block form. In this case, the re-arrangement may be performed based on the scan sequence performed in the encoding apparatus. The dequantizer 220 may perform de-quantization on the quantized transform coefficients using a quantization parameter (e.g., quantization step size information), and may obtain transform coefficients.

The inverse transformer 230 may output a residual signal (residual block or residual sample array) by applying inverse-transform to transform coefficients.

The predictor may perform a prediction on a current block, and may generate a predicted block including prediction samples for the current block. The predictor may determine whether an intra prediction is applied or inter prediction is applied to the current block based on information on a prediction, which is output by the entropy decoder 210, and may determine a detailed intra/inter prediction mode.

The intra predictor 265 may predict a current block with reference to samples within a current picture. The referred samples may be located to neighbor a current block or may be spaced apart from a current block depending on a prediction mode. In an intra prediction, prediction modes may include a plurality of non-angular modes and a plurality of angular modes. The intra predictor 265 may determine a prediction mode applied to a current block using a prediction mode applied to a neighboring block.

The inter predictor 260 may derive a predicted block for a current block based on a reference block (reference sample array) specified by a motion vector on a reference picture. In this case, in order to reduce the amount of motion information transmitted in an inter prediction mode, motion information may be predicted as a block, a sub-block or a sample unit based on the correlation of motion information between a neighboring block and the current block. The motion information may include a motion vector and a reference picture index. The motion information may further include inter prediction direction (L0 prediction, L1 prediction, Bi prediction) information. In the case of inter prediction, a neighboring block may include a spatial neighboring block within a current picture and a temporal neighboring block within a reference picture. For example, the inter predictor 260 may configure a motion information candidate list based on neighboring blocks, and may derive a motion vector and/or reference picture index of a current block based on received candidate selection information. An inter prediction may be performed based on various prediction modes. Information on the prediction may include information indicating a mode of inter prediction for a current block.

The adder 235 may generate a reconstructed signal (reconstructed picture, reconstructed block or reconstructed sample array) by adding an obtained residual signal to a prediction signal (predicted block or prediction sample array) output by the inter predictor 260 or the intra predictor 265. A predicted block may be used as a reconstructed block if there is no residual for a processing target block as in the case where a skip mode has been applied.

The adder 235 may be called a reconstructor or a reconstruction block generator. The generated reconstructed signal may be used for the intra prediction of a next processing target block within a current picture, and may be used for the inter prediction of a next picture through filtering as will be described later.

The filter 240 can improve subjective/objective picture quality by applying filtering to a reconstructed signal. For example, the filter 240 may generate a modified reconstructed picture by applying various filtering methods to a reconstructed picture, and may transmit the modified reconstructed picture to the memory 250, more particularly to the DPB of the memory 250. The various filtering methods may include deblocking filtering, a sample adaptive offset SAO, an adaptive loop filter ALF, and a bilateral filter, for example.

The (modified) reconstructed picture stored in the DPB of the memory 250 may be used as a reference picture in the inter predictor 260. The memory 250 may store motion information of a block in which the motion information in the current picture is derived (or decoded) and/or motion information of blocks in an already reconstructed picture. The stored motion information may be forwarded to the inter predictor 260 to be utilized as motion information of a spatial neighboring block or motion information of a temporal neighboring block. The memory 250 may store reconstructed samples of the reconstructed blocks in the current picture and forward it to the intra predictor 265.

Further, the line buffer 254 of the memory 250 may store information on samples of the corresponding line for each line of the picture, the frame, the slice, the tile, or the brick of a video signal to be decoded. For example, the line buffer 254 may include information on luma values, chroma values, prediction modes, or prediction vectors of samples of each line. The line buffer 254 may be constituted by a plurality of storage memories for each line.

In the disclosure, the embodiments described in the filter 160, inter predictor 180 and intra predictor 185 of the encoding apparatus 100 may be applied to the filter 240, inter predictor 260 and intra predictor 265 of the decoding apparatus 200, respectively, identically or in a correspondence manner.

Block Partitioning

The video/image coding method according to the present disclosure may be performed based on various detailed techniques, and each of the various detailed techniques is described as below. It is apparent to those skilled in the art that the techniques described herein may be associated with the related procedure such as a prediction, a residual process ((inverse) transform, (de) quantization, etc.), a syntax element coding, a filtering, a partitioning/splitting in a video/image encoding/decoding procedure described above and/or described below.

The block partitioning procedure according to the present disclosure may be performed in the image divider 110 of the encoding apparatus described above, and the partitioning related information may be (encoding) processed in the entropy encoder 190 and forwarded to the decoding apparatus in a bitstream format. The entropy decoder 210 of the decoding apparatus may obtain a block partitioning structure of a current picture based on the partitioning related information obtained from the bitstream, and based on it, may perform a series of procedure (e.g., prediction, residual processing, block reconstruction, in-loop filtering, etc.) for an image decoding.

Partitioning of Picture into CTUs

Pictures may be divided into a sequence of coding tree units (CTUs). A CTU may correspond to a coding tree block (CTB). Alternatively, a CTU may include a coding tree block of luma samples and two coding tree blocks of corresponding chroma samples. In other words, for a picture including three types of sample arrays, a CTU may include a N×N block of luma samples and two corresponding samples of chroma samples.

A maximum supported size of a CTU for coding and prediction may be different from a maximum supported size of a CTU for transform. For example, a maximum supported size of luma block in a CTU may be 128×128.

Partitioning of the CTUs Using a Tree Structure

A CTU may be divided into CUs based on a quad-tree (QT) structure. The quad-tree structure may be called as a quaternary structure. This is for reflecting various local characteristics. Meanwhile, in the present disclosure, a CTU may be divided based on a multi-type tree structure partitioning including a binary-tree (BT) and a ternary-tree (TT) as well as the quad-tree. Hereinafter, QTBT structure may include the quad-tree and binary-tree structures, and QTBTTT may include partitioning structures based on the binary-tree and ternary-tree. Alternatively, the QTBT structure may also include partitioning structures based on the quad-tree, binary-tree and ternary-tree. In the coding tree structure, a CU may have a square or rectangle shape. A CTU may be divided into a quad-tree structure, first. And then, leaf nodes of the quad-tree structure may be additionally divided by the multi-type tree structure.

Figure 3:
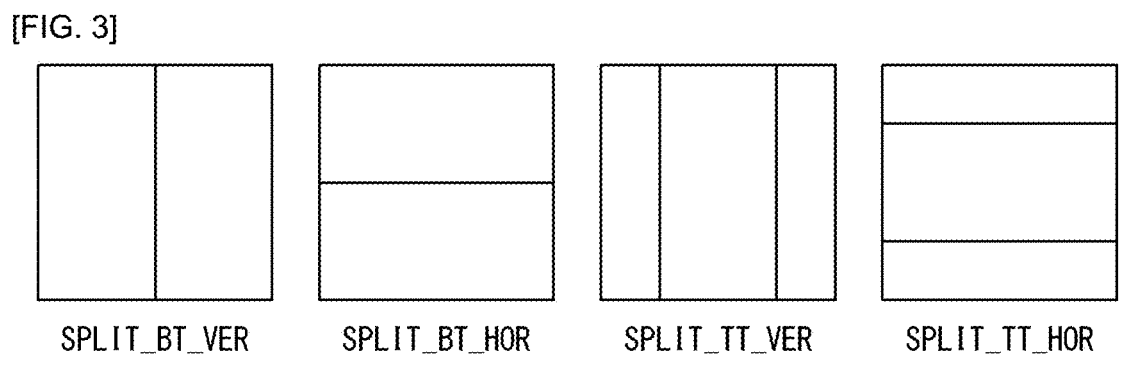

FIG. 3 is a diagram illustrating an example of a multi-type tree structure as an embodiment to which the present disclosure may be applied.

In an embodiment of the present disclosure, a multi-type tree structure may include 4 split types as shown in FIG. 3. The 4 split types may include a vertical binary splitting (SPLIT_BT_VER), a horizontal binary splitting (SPLIT_BT_HOR), a vertical ternary splitting (SPLIT_TT_VER) and a horizontal ternary splitting (SPLIT_TT_HOR). The leaf nodes of the multi-type tree structure may be called as CUs. Such CUs may be used for prediction and transform procedure. In the present disclosure, generally, a CU, a PU and a TU may have the same block size. However, in the case that a maximum supported transform length is smaller than a width or a height of a color component, a CU and a TU may have different block sizes.

FIG. 4 is a diagram illustrating a signaling mechanism of partition split information of a quadtree with nested multi-type tree structure as an embodiment to which the present disclosure may be applied.

Here, a CTU may be treated as a root of a quad-tree and initially partitioned into a quad-tree structure. Each quad-tree leaf node may be further partitioned into a multi-type tree structure later. In the multi-type tree structure, a first flag (e.g., mtt_split_cu_flag) is signaled to indicate whether the corresponding node is further partitioned). In the case that the corresponding node is further partitioned, a second flag (e.g., mtt_split_cu_verticla_flag) may be signaled to indicate a splitting direction. Later, a third flag (e.g., mtt_split_cu_binary_flag) may be signaled to indicate whether the split type is a binary split or a ternary split. For example, based on the mtt_split_cu_vertical_flag and the mtt_split_cu_binary_flag, a multi-type tree splitting mode (MttSplitMode) may be derived as represented in Table 1 below.

TABLE 1

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

FIG. 5 is a diagram illustrating a method of partitioning a CTU into multiple CUs based on a quadtree and nested multi-type tree structure as an embodiment to which the present disclosure may be applied.

Here, bolded block edges represent a quad-tree partitioning, and the remaining edges represent a multi-type tree partitioning. The quad-tree partition with nested multi-type tree may provide a contents-adapted coding tree structure. A CU may correspond to a coding block (CB). Or, a CU may include a coding block of luma samples and two coding blocks of corresponding chroma samples. A size of CU may be great as much as a CTU or may be small as 4×4 in a luma sample unit. For example, in the case of 4:2:0 color format (or chroma format), a maximum chroma CB size may be 64×64, and a minimum chroma CB size may be 2×2.

In the present disclosure, for example, a maximum supported luma TB size may be 64×64, and a maximum supported chroma TB size may be 32×32. In the case that a width or a height of a CB partitioned according to the tree structure is greater than a maximum transform width or height, the CB may be further partitioned until a TB size limit in horizontal and vertical directions are satisfied automatically (or implicitly).

Meanwhile, for the quad-tree coding tree scheme with nested multi-type free, the following parameters may be defined or recognized as SPS syntax element.

CTU size: the root node size of a quaternary tree

MinQTSize: the minimum allowed quaternary tree leaf node size

MaxBtSize: the maximum allowed binary tree root node size

MaxTtSize: the maximum allowed ternary tree root node size

MaxMttDepth: the maximum allowed hierarchy depth of multi-type tree splitting from a quadtree leaf MinBtSize: the minimum allowed binary tree leaf node size MinTtSize: the minimum allowed ternary tree leaf node size As an example of the quad-tree coding tree scheme with nested multi-type tree, a CTU size may be set to 128×128 luma samples and 64×64 blocks of two corresponding chroma samples (in 4:2:0 chroma sample). In this case, MinOTSize may be set to 16×16, MaxBtSize may be set to 128×128, MaxTtSzie may be set to 64×64, MinBtSize and MinTtSize (for both width and height) may be set to 4×4, and MaxMttDepth may be set to 4. The quad-tree partitioning may be applied to a CTU and generate quad-tree leaf nodes. The quad-tree leaf node may be called a leaf QT node. The quad-tree leaf nodes may have a size from 16×16 size (i.e. the MinOTSize) to 128×128 size (i.e. the CTU size). In the case that a leaf QT node is 128×128, the leaf QT node may not be partitioned into a binary-tree/ternary-tree. This is because the leaf QT node exceeds MaxBtsize and MaxTtsize (i.e., 64×64) even in the case the leaf QT node is partitioned. In other case, the leaf QT node may be additionally partitioned into a multi-type tree. Therefore, the leaf QT node may be a root node for the multi-type tree, and the leaf QT node may have multi-type tree depth (mttDepth) 0 value. In the case that the multi-type tree depth reaches MaxMttdepth (e.g., 4), no more additional partition may be considered. In the case that a width of the multi-type tree node is equal to MinBtSize and smaller than or equal to 2×MinTtSize, no more additional horizontal partitioning may be considered. In the case that a height of the multi-type tree node is equal to MinBtSize and smaller than or equal to 2×MinTtSize, no more additional vertical partitioning may be considered.

FIG. 6 is a diagram illustrating a method for limiting a ternary-tree split as an embodiment to which the present disclosure may be applied.

Referring to FIG. 6, in order to support 64×64 luma block and 32×32 chroma pipeline design in a hardware decoder, a TT split may be limited in a specific case. For example, in the case that a width or a height of a luma coding block is greater than a predetermined specific value (e.g., 32, 64), as shown in FIG. 6, a TT split may be limited.

In the present disclosure, the coding tree scheme may support that a luma and chroma block have a separate block tree structure. With respect to P and B slices, luma and chroma CTBs in a single CTU may be limited to have the same coding tree structure. However, with respect to I slices, luma and chroma blocks may have respective individual block tree structures. In the case that the individual block tree mode is applied, a luma CTB may be partitioned into CUs based on a specific coding tree structure, and a chroma CTB may be partitioned into chroma CUs based on a different coding tree structure. This may mean that a CU in I slice may include a coding block of chroma component or coding blocks of two chroma component, and a CU in P or B slice may include blocks of three color components.

In the "Partitioning of the CTUs using a tree structure" described above, the quad-tree coding tree scheme with nested multi-type tree is described, but a structure in which a CU is partitioned is not limited thereto. For example, BT structure and TT structure may be interpreted as the concept included in the Multiple Partitioning Tree (MPT) structure, and it may be interpreted that a CU is partitioned through QT structure and MPT structure. In an example that a CU is partitioned through QT structure and MPT structure, a syntax element including information on the number of blocks to which a leaf node of QT structure is partitioned (e.g., MPT_split_type) and a syntax element including information a direction to which a leaf node of QT structure is partitioned between vertical and horizontal directions (e.g., MPT_split_mode) may be signaled, and a split structure may be determined.

In another example, a CU may be partitioned in a method different from QT structure, BT structure or TT structure. That is, different from that a CU of a lower layer depth is partitioned to ¼ size of a CU of a higher layer depth according to QT structure, a CU of a lower layer depth is partitioned to ½ size of a CU of a higher layer depth according to BT structure, or a CU of a lower layer depth is partitioned to ¼ size or ½ size of a CU of a higher layer depth according to TT structure, a CU of a lower layer depth may be partitioned into ⅕, ⅓, ⅜, ⅗, ⅔ or ⅝ size of a CU of a higher layer depth in some cases, but a method of partitioning a CU is not limited thereto.

Meanwhile, the quad-tree coding tree scheme with nested multi-type tree described above may provide very flexible partitioning structure. Owing to the split types supported in the multi-type tree, different split patterns may bring a result of the same coding block structure in some cases. By limiting generations of such redundant split patterns, a data amount of partitioning information may be reduced. This is described with reference to the following drawing.

FIG. 7 is a diagram illustrating redundant split patterns that may be generated in binary-tree split and ternary-tree split as an embodiment to which the present disclosure may be applied.

As shown in FIG. 7, two levels of consecutive binary splits in one direction may have the same coding block structure as the binary split for a center partition after a ternary split. In this case, the binary-tree split for the center partition of the ternary-tree split may be limited (in the given direction). Such a limit may be applied to CUs of all pictures. In the case that such a specific split is limited, signaling of the corresponding syntax elements may be modified by reflecting the limited case, and through this, the number of bits signaled for partitioning may be reduced. For example, as exemplified in FIG. 7, in the case that the binary-tree split for the center partition of a CU is limited, mtt_split_cu_binary_flag syntax element that indicates whether a split is the binary split or the ternary split may not be signaled, and the value may be inferred by a decoder as 0.

Prediction

In order to reconstruct a current processing unit in which decoding is performed, decoded parts of a current picture or other pictures including the current processing unit may be used.

A picture using only the current picture for reconstruction, i.e., performing the intra prediction may be referred to as an intra picture or an I picture (slice), a picture (slice) using up to one motion vector and reference index in order to predict each unit may be referred to as a predictive picture or P picture (slice), and a picture (slice) using up to two motion vectors and reference indexes may be referred to as a bi-predictive picture or B picture (slice).

The intra prediction means a prediction method that derives a current processing block from a data element (e.g., a sample value, etc.) of the same decoded picture (or slice). In other words, the intra prediction means a method for predicting a pixel value of the current processing block by referring to reconstructed areas in the current picture.

Hereinafter, the inter prediction will be described in more detail.

Inter Prediction

The inter prediction means a prediction method of deriving the current processing block based on data elements (e.g., the sample value or motion vector) of pictures other than the current picture. In other words, the intra prediction means a method for predicting a pixel value of the current processing block by referring to reconstructed areas in other reconstructed pictures other than the current picture.

The inter prediction (inter-picture prediction) as a technique for eliminating redundancy existing between pictures is mostly performed by motion estimation and motion compensation.

In the present disclosure, a detailed description of the inter prediction method described above is made and the decoder may be represented as an inter prediction based video/image decoding method of FIG. 10 and an inter-prediction unit in the decoder 200 of FIG. 11 to be described below. Moreover, the encoder may be represented as an inter prediction based video/image encoding method of FIG. 8 and the inter-prediction unit in the encoder 100 of FIG. 9 to be described below. In addition, data encoded by FIGS. 10 and 11 may be stored in the form of a bitstream.

The prediction unit of the encoder 100/decoder 200 may derive the predicted sample by performing the inter prediction in units of the block. The inter prediction may represent prediction derived by a method dependent to the data elements (e.g., sample values or motion information) of a picture(s) other than the current picture. When the inter prediction is applied to the current block, a predicted block (prediction sample array) for the current block may be derived based on a reference block (reference sample array) specified by the motion vector on the reference picture indicated by the reference picture index.

In this case, in order to reduce an amount of motion information transmitted in the inter-prediction mode, the motion information of the current block may be predicted in units of a block, a subblock, or a sample based on a correlation of the motion information between the neighboring block and the current block. The motion information may include the motion vector and the reference picture index. The motion information may further include inter-prediction type (L0 prediction, L1 prediction, Bi prediction, etc.) information.

In the case of applying the inter prediction, the neighboring block may include a spatial neighboring block which is present in the current picture and a temporal neighboring block which is present in the reference picture. A reference picture including the reference block and a reference picture including the temporal neighboring block may be the same as each other or different from each other. The temporal neighboring block may be referred to as a name such as a collocated reference block, a collocated CU (colCU), etc., and the reference picture including the temporal neighboring block may be referred to as a collocated picture (colPic). For example, a motion information candidate list (or inherited candidate list) may be configured based on the neighboring blocks of the current block and a flag or index information indicating which candidate is selected (used) may be signaled in order to derive the motion vector and/or reference picture index of the current block.

The inter prediction may be performed based on various prediction modes and for example, in the case of a skip mode and a merge mode, the motion information of the current block may be the same as the motion information of the selected neighboring block. In the case of the skip mode, the residual signal may not be transmitted unlike the merge mode. In the case of a motion vector prediction (MVP) mode, the motion vector of the selected neighboring block may be used as a motion vector predictor and a motion vector difference value may be signaled. In this case, the motion vector of the current block may be derived by using a sum of the motion vector predictor and the motion vector difference.

FIGS. 8 and 9 are diagrams illustrating an inter prediction based video/image encoding method according to an embodiment of the present disclosure and an inter prediction unit in an encoder 100 according to an embodiment of the present disclosure.

Referring to FIGS. 8 and 9, step S801 may be performed by the inter-prediction unit 180 of the encoder 100 and step S802 may be performed by the residual processing unit of the encoder 100. Specifically, step S802 may be performed the subtraction unit 115 of the encoder 100. In step S803, prediction information may be derived by the inter-prediction unit 180 and encoded by the entropy encoding unit 190. In step S803, residual information may be derived by the residual processing unit and encoded by the entropy encoding unit 190. The residual information is information on the residual samples. The residual information may include information on quantized transform coefficients for the residual samples.

As described above, the residual samples may be derived as transform coefficients by the transform unit 120 of the encoder 100 and the transform coefficients may be derived as quantized transform coefficients by the quantization unit 130. Information on the quantized transform coefficients may be encoded through a residual coding procedure by the entropy encoding unit 190.

The encoder 100 performs inter prediction for the current block (S810). The encoder 100 may derive the inter prediction mode and the motion information of the current block and generate predicted samples of the current block. Here, an inter prediction mode determining procedure, a motion information deriving procedure, and a generation procedure of the prediction samples may be simultaneously performed and any one procedure may be performed earlier than other procedures. For example, the inter-prediction unit 180 of the encoder 100 may include a prediction mode determining unit 181, a motion information deriving unit 182, and a prediction sample deriving unit 183. The prediction mode determining unit 181 may determine the prediction mode for the current block. The motion information deriving unit 182 may derive the motion information of the current block. The prediction sample deriving unit 183 may derive motion samples of the current block.

For example, the inter-prediction unit 180 of the encoder 100 may search a block similar to the current block in a predetermined area (search area) of reference pictures through motion estimation and derive a reference block in which a difference from the current block is minimum or is equal to or less than a predetermined criterion. A reference picture index indicating a reference picture at which the reference block is positioned may be derived based thereon and a motion vector may be derived based on a difference in location between the reference block and the current block. The encoder 100 may determine a mode applied to the current block among various prediction modes. The encoding apparatus may compare rate-distortion cost (RD cost) for the various prediction modes and determine an optimal prediction mode for the current block.

For example, when the skip mode or the merge mode is applied to the current block, the encoder 100 may configure a merging candidate list to be described below and derive a reference block in which a difference from the current block is minimum or is equal to or less than a predetermined criterion among reference blocks indicated by merge candidates included in the merging candidate list. In this case, a merge candidate associated with the derived reference block may be selected and merge index information indicating the selected merge candidate may be generated and signaled to the decoder 200. The motion information of the current block may be derived from the motion information of the selected merge candidate.

As another example, when an (A)MVP mode is applied to the current block, the encoder 100 may configure an (A)MVP candidate list to be described below and use a motion vector of a selected MVP candidate among motion vector predictor (MVP) candidates included in the (A)MVP candidate list as the MVP of the current block. In this case, for example, the motion vector indicating the reference block derived by the motion estimation may be used as the motion vector of the current block and an MVP candidate having a motion vector with a smallest difference from the motion vector of the current block among the MVP candidates may become the selected MVP candidate. A motion vector difference (MVD) which is a difference obtained by subtracting the MVP from the motion vector of the current block may be derived. In this case, the information on the MVD may be signaled to the decoder 200. Furthermore, when the (A)MVP mode is applied, the value of the reference picture index may be included in reference picture index information. The reference picture index information including the reference picture index value may be separately signaled to the decoder 200.

The encoder 100 may derive the residual samples based on the predicted samples (S820). The encoder 100 may derive the residual samples by comparing original samples and the prediction samples of the current block. The prediction information may include information on prediction mode information (e.g., skip flag, merge flag or mode index, etc.) and information on motion information as information related to the prediction procedure. The information on the motion information may include candidate selection information (e.g., merge index, mvp flag or mvp index) which is information for deriving the motion vector. Furthermore, the information on the motion may include the information on the MVD and/or the reference picture index information.

Furthermore, the information on the motion may include information indicating whether to apply the L0 prediction, the L1 prediction, or the bi-prediction. The residual information may include the information on the residual samples. The residual information may include information on quantized transform coefficients for the residual samples.

An output bitstream may be stored in a (digital) storage medium and directly transferred to the decoder 200 or transferred to the decoder 200 via the network.

Meanwhile, as described above, the encoder 100 may generate a reconstructed picture (including reconstructed samples and reconstructed blocks) based on the reference samples and the residual samples. The generation of the reconstructed picture by the encoder 100 is to drive the same prediction result as being performed by the decoder 200 by the encoder 100. Coding efficiency may be increased through the generation of the reconstructed picture by the encoder 100. Accordingly, the encoder 100 may store the reconstructed picture (or reconstructed samples or reconstructed blocks) in the memory and utilize the reconstructed picture as the reference picture. As described above, an in-loop filtering procedure for the reconstruction picture may be further applied.

FIGS. 10 and 11 are diagrams illustrating an inter prediction based video/image decoding method according to an embodiment of the present disclosure and an inter prediction unit 260 in a decoder according to an embodiment of the present disclosure. Referring to FIGS. 12 and 13, the decoder 200 may perform an operation corresponding to the operation performed by the encoder 100. The decoder 200 may perform the prediction for the current block based on received prediction information and derive the prediction samples.

Steps S1010 to S1030 may be performed by the inter-prediction unit 260 of the decoder 200 and the residual information of S1040 may be obtained from the bitstream by the entropy decoding unit 210 of the decoder 200. The residual processing unit of the decoder 200 may derive the residual samples for the current block based on the residual information. Specifically, the dequantization unit 220 of the decoder 200 may derive transform coefficients by performing dequantization based on quantized transform coefficients derived based on the residual information and the inverse transform unit 230 of the decoder 200 may derive the residual samples for the current block by performing inverse transform for the transform coefficients. Step S1050 may be performed by the addition unit 235 or the reconstruction unit of the decoder 200.

Specifically, the decoder 200 may determine the prediction mode for the current block based on the prediction information received from the encoder 100 (S1010). The prediction mode determining unit 261 of the decoder 200 may determine which inter prediction mode is applied to the current block based on the prediction mode information included in the prediction information.

For example, the prediction mode determining unit 261 may determine whether the merge mode or the (A)MVP mode is applied to the current block based on the merge flag. Furthermore, the prediction mode determining unit 261 may select one of various inter prediction mode candidates based on a mode index. The inter prediction mode candidates may include a skip mode, a merge mode, and/or an (A)MVP mode or may include various inter prediction modes (e.g., affine merge mode and affine MVP mode) described above.

The motion information deriving unit 262 of the decoder 200 may derive the motion information of the current block based on the inter prediction mode determined by the prediction mode determining unit 261 (S1220). For example, when the skip mode or the merge mode is applied to the current block, the motion information deriving unit 262 may configure the merge candidate list to be described below and select one merge candidate among the merge candidates included in the merge candidate list. The motion information deriving unit 262 may select the merge candidate based on the selected information (e.g., merge index). The motion information of the current block may be derived from the motion information of the selected merge candidate. In other words, the motion information of the selected merge candidate may be used as the motion information of the current block.

As another example, when an (A)MVP mode is applied to the current block, the motion information deriving unit 262 may configure an (A)MVP candidate list to be described below and use a motion vector of a selected mvp candidate among motion vector predictor (mvp) candidates included in the (A)MVP candidate list as the mvp of the current block. The motion information deriving unit 262 may select the motion vector of the MVP candidate based on the selected information (e.g., mvp flag or mvp index). In this case, the MVD of the current block may be derived from the information on the MVD. Further, the motion vector of the current block may be derived based on the MVP and the MVD of the current block. Furthermore, the reference picture index of the current block may be derived based on the reference picture index information. The picture indicated by the reference picture index in the reference picture list for the current block may be derived as the reference picture referred for the inter prediction of the current block.

Meanwhile, the motion information of the current block may be derived without the candidate list configuration. When the motion information of the current block is derived without the candidate list configuration, the motion information of the current block may be derived according to a procedure disclosed in the prediction mode. When the motion information of the current block is derived without the candidate list configuration, the candidate list configuration may be skipped.

The prediction sample deriving unit 263 may generate the prediction samples for the current block based on the motion information of the current block (S1030). The prediction sample deriving unit 263 may derive the reference picture based on the reference picture index of the current block and derive the prediction samples of the current block by using the samples of the reference block indicated by the motion vector of the current block on the reference picture. Furthermore, the prediction sample deriving unit 263 may perform prediction sample filtering for all or some of the prediction samples of the current block.

In other words, the inter-prediction unit 260 of the decoder 200 may include a prediction mode determining unit 261, a motion information deriving unit 262, and a prediction sample deriving unit 263. For example, in the decoder 200, the prediction mode determining unit 261 may determine the prediction mode for the current block based on the received prediction mode information, the motion information deriving unit 262 may derive the motion information (the motion vector and/or reference picture index) of the current block based on the information on the received motion information, and the prediction sample deriving unit 263 may derive the predicted samples of the current block. For convenience of description, the operation by the inter-prediction unit 260, the prediction mode determining unit 261, or the prediction sample deriving unit 263 is collectively referred to as the operation of the decoder 200.

The decoder 200 may generate the residual samples for the current block based on the received residual information (S1040). The decoder 200 may generate the reconstruction samples for the current block based on the prediction samples and the residual samples and generate the reconstruction picture based on the generated reconstruction samples (S1050). Thereafter, an in-loop filtering procedure for the reconstruction picture may be further applied.

As described above, the inter prediction procedure may include an inter prediction mode determining step, a motion information deriving step depending on the determined prediction mode, and a prediction performing (predicted sample generating) step based on the derived motion information.

In the following description, a method for performing affine motion prediction for the current block to be decoded based on the decoder 200 will be described. In the following description, embodiments of the present disclosure are described based on the decoder 200, but the scope of the present disclosure is not limited to the decoder 200, and substantially the same process may be applied to the encoder 100.

FIG. 12 illustrates an example of a motion model of an affine motion prediction technique according to an embodiment of the present disclosure.

In most video coding standards including high efficiency video coding (HEVC), motion estimation and motion compensation adopt an efficient translation motion model in expressing a simple motion. Old motion analysis models may not be effective in expressing complex motions such as zooming, rotation, or irregular motions in natural video. Affine motion prediction may effectively express irregular motions.

When a 4-parameter affine motion model (or a simplified affine motion model) illustrated in FIG. 12 is used, an affine motion vector field (MVF) may be described as two motion vectors. Referring to FIG. 12, a top left control point (hereinafter, a first control point) CP0 and a top right control point (hereinafter, a second control point) CP1 of a current block 1200 to be predicted may have independent motion vectors from each other. For example, as illustrated in FIG. 12, the first control point CP0 may have a first control point motion vector CPMV0 and the second control point CP1 may have a second control point motion vector CPMV1. Here, the first control point motion vector CPMV0 and the second control point motion vector CPMV1 may be determined independently from each other.

The motion vector field (MVF) of the current block 1200 may be determined as shown in Equation 1 below. The motion vector field (MVF) of the current block 1200 may be determined as shown in Equation 1 below.

$$\begin{cases} v_x(x, y) = \frac{(v_{1x} - v_{0x})}{w} * x - \frac{(v_{1y} - v_{0y})}{w} * y + v_{0x} \\ v_y(x, y) = \frac{(v_{1y} - v_{0y})}{w} * x - \frac{(v_{1x} - v_{0x})}{w} * y + v_{0y} \end{cases} \quad \text{[Equation 1]}$$

$v_x$(x,y) may represent an x-axis scalar value of the motion vector in subblock (x,y) of the current block 1200, $v_y$(x,y) may represent a y-axis scalar value of the motion vector in subblock (x,y) of the current block 1200, w may represent a width of the current block 1200, $v_{0x}$ may represent an x-axis scalar value of the first control point motion vector CPMV0 of the current block 1200, $v_{0y}$ may represent a y-axis scalar value of the first control point motion vector CPMV0, $v_{1x}$ may represent an x-axis of the second control point motion vector CPMV1, and $v_{1y}$ may represent a y-axis scalar value of the second control point motion vector CPMV1.

The first control point motion vector CPMV0 and the second control point motion vector CPMV1 may be shown as in Equation 2.

$$cpmv_0 = \{v_{0x}, v_{0y}\}, cpmv_1 = \{v_{1x}, v_{1y}\} \quad \text{[Equation 2]}$$

In Equation 2, CPMV0 represent a motion vector (first control point motion vector) of a top left point of the current block 1200, CPMV1 represents a motion vector (second control point motion vector) of a top right point of the current block 1200, $v_{0x}$ represents an x-axis scalar value of the first control point motion vector CPMV0 of the current block 1200, $v_{0y}$ represents a y-axis scalar value of the first control point motion vector CPMV0, $v_{1x}$ represents an x-axis of the second control point motion vector CPMV1, and $v_{1y}$ represents a y-axis scalar value of the second control point motion vector CPMV1.

The affine motion information which is a term used below may be referred to as a list of vectors or candidate vectors used for affine motion prediction such as the first control point motion vector CPMV0 or the second control point motion vector CPMV1 illustrated in FIG. 12.

FIG. 13 illustrates an example of a motion vector field for each subblock in a coding block to which an affine motion prediction technique is applied according to an embodiment of the present disclosure.

In affine motion compensation, the affine motion vector field (MVF) may be determined at a subblock level in order to reduce an affine motion compensation complexity. A motion vector (MV) at a center position of each subblock may be calculated according to Equation 1. FIG. 13 illustrates an example of the affine motion vector field (MVF) determined at a 4*4 subblock level.

An affine motion prediction mode for determining the first control point motion vector CPMV0 and the second control point motion vector CPMV1 includes an affine inter mode and an affine merge mode. In the affine inter mode, motion vector difference (MVD) information between the first control point motion vector CPMV0 and the second control point motion vector CPMV1 is explicitly signaled to determine the first control point motion vector CPMV0 and the second control point motion vector CPMV1. The affine inter mode may be referred to as an affine motion vector prediction (MVP) mode and hereinafter, the affine inter mode will be referred to as an affine MVP mode.

On the contrary, in the affine merge mode, a control point motion vector (CPMV) pair may be determined without signaling of the motion vector difference (MVD) information. More specifically, there is a method for encoding or decoding the current block by deriving two or three control point motion vectors from at least one neighbor block adjacent to the current block to be currently decoded without encoding the motion vector difference (MVD) values similarly to the merge mode or the skip mode described above in the affine merge mode.

Embodiment 1

In an embodiment of the present disclosure, proposed is a method for using an inherited affine candidate as the candidate of the affine merge mode. There is a method for deriving motion information of the current block by using the affine motion model of the neighbor affine block and encoding/decoding the current block by using the derived motion information when a neighbor block is a block (hereinafter, referred to as a neighbor affine block) coded by affine prediction. Here, the motion information includes at least one of the motion vector, a reference list (or reference picture list), and/or a reference index (or reference picture index).

That is, the inherited affine candidate is valid only when there is the neighbor affine block and the encoder/decoder may generate a predefined number of inherited affine merge candidates.

According to an embodiment of the present disclosure, the affine motion prediction based on the inherited affine candidate is a method for deriving the motion information (motion vector and reference frame index) of the current block by using the affine motion model of the neighbor affine block and decoding or encoding the block by using the derived motion information when the neighbor block is a block (hereinafter, neighbor affine block) coded by the affine motion prediction. The inherited affine candidate may be used for candidate list construction of the affine merge mode and the affine inter mode.

In an embodiment, the following affine motion prediction information of the neighbor block may be used in order to generate the inherited affine candidate.

1) Affine flag (affine_flag): Flag for specifying whether to encode the affine motion prediction of the corresponding block
2) Motion information or affine motion information
   - In case of 4-parameter model: Motion information (motion vector and reference index) for L0 and L1 corresponding to CP0 and CP1
   - In case of 6-parameter model: Alternatively, motion information (motion vector and reference index) for each of L0 and L1 corresponding to CP0, CP1, and CP2

FIG. 14 is a diagram illustrating a method for performing affine motion prediction using a neighbor affine coded block as an embodiment to which the present disclosure is applied.

Referring to FIG. 14, the decoder is primarily described for convenience of description, but the present disclosure is not limited thereto and the affine prediction predicting method using the neighbor affine coded block according to an embodiment of the present disclosure may be performed substantially similarly in the encoder.

The decoder adds, to an affine merge candidate list, an affine coded block coded in an affine prediction mode among neighbor blocks of a current block (S1401). The decoder may generate a predefined maximum number of affine merge candidates by using valid neighbor affine blocks. The decoder may add, to the affine merge candidate list, the predefined maximum number of generated affine merge candidates.

The decoder obtains a syntax element indicating a specific candidate used for the affine motion prediction of the current block in the affine candidate list (S1402).

The decoder derives control point motion vectors of the current block based on an affine motion model of the candidate indicated by the syntax element (S1403).

The decoder generates the prediction block of the current block by using the control point motion vectors of the current block (S1404). As an embodiment, the decoder may derive the motion vector of each of a plurality of subblocks which belongs to the current block by using the control point motion vectors and generate the prediction block of the current block by using the motion vector of each of the derived subblocks.

In an embodiment of the present disclosure, the decoder may predefine an order for scanning (or check or examine) the neighbor blocks in constructing the affine merge candidate list by using the affine coded blocks. The embodiment will be described with reference to the following drawing.

FIG. 15 illustrates an example of neighbor blocks used for affine motion prediction as an embodiment to which the present disclosure is applied.

Referring to FIG. 15, the decoder is primarily described for convenience of description, but the present disclosure is not limited thereto and the affine prediction predicting method using the neighbor affine coded block according to an embodiment of the present disclosure may be performed substantially similarly in the encoder.

Referring to FIG. 15, the decoder may consider the neighbor blocks illustrated in FIGS. 15(*a*) and 15(*b*) as the affine motion prediction candidate.

As an embodiment, the decoder may predefine an order for scanning (or check or examine) the neighbor blocks in constructing the affine merge candidate list by using the affine coded blocks. In this case, the order of scanning the neighbor blocks may be defined as various orders. As an example, the predefined order may be {C0, B0, B1, C1, A0} in FIG. 15(*a*), and {C0, B0, B1, C1, A2, A1, A0} in FIG. 15(*b*). As another example, the decoder may group the neighbor blocks illustrated in FIG. 15(*a*) or 15(*b*) and derive the affine candidate within each neighbor block group. Furthermore, as an example, the decoder may group the neighbor blocks and define a scan order (or check order or examination order) for deriving the affine candidate in each neighbor block group. A specific embodiment will be described in detail in Embodiment 3.

Hereinafter, a method for generating the affine merge candidate will be described by assuming that the maximum number of affine merge candidates is 1. When the number of neighbor affine blocks is 1, the decoder may generate one affine merge candidate.

When the number of neighbor affine blocks is 2 or more, the decoder may select (or determine) the neighbor affine blocks for generating the affine merge candidate by using any one of the following methods.

1) The decoder may scan the neighbor blocks according to the predefined order and use (or select or determine) the valid neighbor affine block which is first scanned according to the scan order as the candidate for the affine merge mode. As an example, the predefined order may be the order described in FIG. 15.
2) The decoder may use a neighbor affine block having a smallest reference picture index among the neighbor affine blocks or a reference picture close to the reference picture of the current block as the candidate for the affine merge mode. In this case, the distance between the reference pictures may be determined based on a picture order count (POC). As an embodiment, when the number of neighbor affine blocks having the smallest reference picture index is 2 or more (or when the number of neighbor affine blocks having a reference picture closest to the reference picture of the current block is 2 or more), the decoder may use the neighbor affine block determined according to the predefined order among two or more neighbor affine blocks as the candidate for the affine merge mode. For example, the predefined order may be the order described in FIG. 15.
3) The decoder may use a neighbor affine block having a reference index which most frequently occurs as the candidate for the affine merge mode. As an embodiment, when the number of neighbor affine blocks having the reference index which most frequently occurs is 2 or more, the decoder may use the neighbor affine block determined according to the predefined order among two or more neighbor affine blocks as the candidate for the affine merge mode. For example, the predefined order may be the order described in FIG. 15. Here, the reference index which most frequently occurs may represent a reference index which most frequently occurs based on the number of reference indexes of all neighbor blocks or the number of reference indexes of all neighbor affine blocks.
4) The decoder may use a block having a largest size among the neighbor affine blocks as the candidate for the affine merge mode. As an embodiment, when the number of blocks having the largest size is 2 or more, the decoder may use the neighbor affine block determined according to the predefined order among two or more neighbor affine blocks as the candidate for the affine merge mode. For example, the predefined order may be the order described in FIG. 15.

Hereinabove, a case where the maximum number of affine merge candidates is 1 is primarily described, but the embodiment may be similarly applied even to a case where the maximum number of affine merge candidates is equal to or more than 2. Hereinafter, embodiments in the case where the maximum number of affine merge candidates is 2 will be described. As an example, in the embodiment described below, a pruning check for removing redundant motion information may be performed in each of the methods. Further, hereinafter, the methods to be described below may be similarly applied even to a case where the maximum number of affine merge candidates is more than 2.

1) The decoder may scan the neighbor blocks according to a predefined order and use two valid neighbor affine blocks which are first scanned according to the scan order as the affine merge candidates. As an example, the predefined order may be the order described in FIG. 15.
2) The decoder may use a neighbor affine block having a smallest reference picture index among the neighbor affine blocks or a reference picture close to the reference picture of the current block as the candidate for the affine merge mode. In this case, the distance between the reference pictures may be determined based on a picture order count (POC). As an embodiment, when the number of neighbor affine blocks having the smallest reference picture index is 3 or more (or when the number of neighbor affine blocks having a reference picture closest to the reference picture of the current block is 3 or more), the decoder may use the neighbor affine block determined according to the predefined order among three or more neighbor affine blocks as the affine merge candidate. For example, the predefined order may be the order described in FIG. 15.
3) The decoder may use two neighbor affine blocks having a reference index which most frequently occurs as the affine merge candidates. As an embodiment, when the number of neighbor affine blocks having the reference index which most frequently occurs is 3 or more, the decoder may use the neighbor affine block determined according to the predefined order among three or more neighbor affine blocks as the candidate for the affine merge mode. For example, the predefined order may be the order described in FIG. 15. Here, the reference index which most frequently occurs may represent a reference index which most frequently occurs based on the number of reference indexes of all neighbor blocks or the number of reference indexes of all neighbor affine blocks.
4) The decoder may use two blocks having the largest size among the neighbor affine blocks as the candidates for the affine merge mode. As an embodiment, when the number of blocks having the largest size is 3 or more, the decoder may use the neighbor affine block determined according to the predefined order among three or more neighbor affine blocks as the candidate for the affine merge mode. For example, the predefined order may be the order described in FIG. 15.

Embodiment 2

In an embodiment of the present disclosure, proposed is a method for using an inherited affine candidate as the candidate of the affine inter mode.

FIG. 16 is a diagram illustrating a method for performing affine motion prediction using a neighbor affine coded block as an embodiment to which the present disclosure is applied.

Referring to FIG. 16, the decoder is primarily described for convenience of description, but the present disclosure is not limited thereto and the affine prediction predicting method using the neighbor affine coded block according to an embodiment of the present disclosure may be performed substantially similarly in the encoder.

The decoder adds, to an affine candidate list, an affine coded block coded in an affine prediction mode among neighbor blocks of a current block (S1601). The decoder may generate a predefined maximum number of affine candidates by using valid neighbor affine blocks. The decoder may add, to the affine candidate list, the predefined maximum number of generated affine candidates. Furthermore, the decoder may add, to the affine candidate list, an affine coded block having the same reference picture as a reference picture of a current block among neighbor blocks.

The decoder obtains a syntax element (or flag syntax) indicating a specific candidate used for the affine motion prediction of the current block in the affine candidate list (S1602).

The decoder derives a control point motion vector predictor of the current block based on an affine motion model of the candidate indicated by the syntax element (S1603).

The decoder derives a control point motion vector of the current block by adding a control point motion vector difference to the control point motion vector predictor (S1604). As an embodiment, the decoder may perform a motion vector difference decoding process for each control point in order to obtain the control point vector difference of each control point of the current block.

The decoder generates the prediction block of the current block by using the control point motion vector of the current block (S1605). As an embodiment, the decoder may derive the motion vector of each of a plurality of subblocks which belongs to the current block by using the control point motion vectors and generate the prediction block of the current block by using the motion vector of each of the derived subblocks.

In an embodiment, the decoder may generate a predefined maximum number of affine candidates by using valid neighbor affine blocks and add the generated affine candidates to the affine candidate list.

Hereinafter, a method for generating the affine candidate will be described by assuming that the maximum number of affine candidates (i.e., affine inter candidates or affine (A)MVP candidates) is 1. When the number of neighbor affine blocks is 1, the decoder may generate one affine candidate.

When the number of neighbor affine blocks is 2 or more, the decoder may select (or determine) the neighbor affine block for generating the affine candidate by using any one of the following methods.

1) The decoder may scan (or examine or check) the neighbor blocks according to the predefined order and use the valid neighbor affine block which is first scanned according to the scan order as the candidate for the affine inter mode. As an example, the predefined order may be the order described in FIG. 15. In this case, the decoder may use a scaled affine candidate as the candidate for the affine inter mode when the reference picture of the current block is not the same as the reference picture of the neighbor affine block. A method for deriving the scaled candidate will be described below.

2) The decoder may use, as the affine inter candidate, a neighbor affine block having the same reference picture or reference index as the current block among the neighbor affine blocks. As an embodiment, the decoder may use, as the affine inter candidate, the neighbor affine block having the same reference picture as the reference picture of the current block among neighbor blocks determined by a predefined order (or priority).

When there is no neighbor affine block having the same reference picture, the decoder may use, as the affine inter candidate, the scaled affine candidate of the neighbor affine block determined by the predefined order. Alternatively, when there is no neighbor affine block having the same reference picture, the decoder may use, as the affine inter candidate, the scaled affine candidate of a neighbor affine block having a reference picture close to the reference picture of the current block. Alternatively, when there is no neighbor affine block having the same reference picture, the decoder may use, as the affine inter candidate, the scaled affine candidate of the neighbor affine block having a reference picture closest to the reference picture of the current block. Alternatively, when there is no neighbor affine block having the same reference picture as the reference picture of the current block, the decoder may not consider the inherited affine candidate. That is, when there is no neighbor affine block having the same reference picture as the reference picture of the current block, the decoder may not add the inherited affine candidate to the candidate list.

Hereinabove, a case where the maximum number of affine inter candidates is 1 is primarily described, but the embodiment may be similarly applied even to a case where the maximum number of affine inter candidates is equal to or more than 2. Hereinafter, embodiments in the case where the maximum number of affine inter candidates is 2 will be described.

When the number of neighbor affine blocks is 1, the decoder may generate one affine inter candidate. In this case, the decoder may generate (or construct) the affine inter candidate by using the neighbor affine block having the same reference picture as the reference picture of the current block and coded in the affine prediction mode.

In an embodiment, when the reference picture of the neighbor affine block is different from the reference picture of the current block, the decoder may scale the corresponding neighbor affine block based on the reference picture (or POC of the reference picture) of the current block and use the scaled neighbor affine block as the affine inter candidate. When the maximum number of affine inter candidates is 2, the decoder may select (or determine) the neighbor affine block for generating the affine candidate by using any one of the following methods.

1) The decoder may scan (or examine or check) the neighbor blocks according to the predefined order and use two valid neighbor affine blocks which are first scanned according to the scan order as the candidate for the affine inter mode. As an example, the predefined order may be the order described in FIG. 15. In this case, the decoder may use a scaled affine candidate as the candidate for the affine inter mode when the reference picture of the current block is not the same as the reference picture of the neighbor affine block. A method for deriving the scaled candidate will be described below.

2) The decoder may use, as the affine inter candidate, a neighbor affine block having the same reference picture or reference index as the current block among the neighbor affine blocks. As an embodiment, the decoder may use, as the affine inter candidate, the neighbor affine block having the same reference picture as the reference picture of the current block among neighbor blocks determined by a predefined order (or priority).

When the number of neighbor affine blocks having the same reference picture is less than 2, the decoder may use, as the affine inter candidate, the scaled affine candidate of the neighbor affine block determined by the predefined order. Alternatively, when the number of neighbor affine blocks having the same reference picture is less than 2, the decoder may use, as the affine inter candidate, the scaled affine candidate of a neighbor affine block having a reference picture close to the reference picture of the current block. Alternatively, when the number of neighbor affine blocks having the same reference picture is less than 2, the decoder may use, as the affine inter candidate, the scaled affine candidate of the neighbor affine block having a reference picture closest to the reference picture of the current block. Alternatively, when the number of neighbor affine blocks having the same reference picture is less than 2, the decoder may not additionally consider the inherited affine candidate. That is, when the number of neighbor affine blocks having the same reference picture is less than 2, the decoder may not additionally consider an additional inherited affine candidate to the candidate list.

In an embodiment, when the reference picture of the neighbor affine block is not the same as the reference picture of the current block, the decoder may scale the affine candidate based on the reference picture (or POC of the reference picture) of the current block and use the scaled candidate as the affine candidate (i.e., scaled affine candidate).

In an embodiment, the decoder performs scaling based on the POC between the reference pictures for each of the first control point at the top left side and the second control point at the top right side to derive (or generate) the scaled affine candidate. Specifically, the motion vector of each control point may be scaled based on a ratio of the POC difference between the current picture and the reference picture and the POC difference between the current picture and the reference picture of the reference block.

Embodiment 3

In an embodiment of the present disclosure, proposed is a method for using an inherited affine candidate as the candidate of the affine inter mode. In an embodiment of the present disclosure, the encoder/decoder may use the neighbor affine block as the inherited affine candidate, and construct the affine candidate list by using the method described in FIG. 16 above and generate an affine-predicted prediction block by deriving the control point motion vector based on the constructed affine candidate list. That is, in an embodiment of the present disclosure, the method described in FIG. 16 above may be applied in the same or similar manner and a redundant description thereof will be omitted.

In an embodiment of the present disclosure, the encoder/decoder may group neighbor blocks and derive the affine candidate for constructing the affine candidate list in each neighbor block group. Furthermore, in an embodiment of the present disclosure, the encoder/decoder may group the neighbor blocks and define a scan order (or check order or examination order) for deriving the affine candidate in each neighbor block group.

In an embodiment, the encoder/decoder may group the neighbor blocks into two or three groups and select (or determine) the affine candidate in each group. Hereinafter, the embodiment will be described with reference to the drawing. However, hereinafter, the embodiment of the present disclosure is described based on the case where the number of grouped groups is 2 or 3, but the number of grouped groups is not limited to 2 or 3 and the groups may be grouped into various numbers.

FIG. 17 illustrates an example of neighbor blocks used for affine motion prediction as an embodiment to which the present disclosure is applied.

Referring to FIG. 17, the decoder is primarily described for convenience of description, but the present disclosure is not limited thereto and the affine prediction predicting method using the neighbor affine coded block according to an embodiment of the present disclosure may be performed substantially similarly in the encoder.

In an embodiment of the present disclosure, the neighbor block illustrated in FIG. 17 may be considered as the affine candidate. In this case, the decoder may search the neighbor affine blocks according to a predefined order. As an example, the decoder may search a valid affine coded block among the neighbor blocks in the order of {A, B, C, D, E, F, G}.

In an embodiment, the decoder may group the neighbor blocks illustrated in FIG. 17 into two or three groups and determine (or select) the affine candidate in each group. However, the neighbor block used for generating the affine candidate list of the present disclosure is not limited to FIG. 17 and various neighbor blocks may be used and a grouping method of the neighbor block described below may also be applied to the neighbor block other than the neighbor block in FIG. 17, of course. For example, the neighbor blocks used for generating the affine candidate list may be the same as the neighbor blocks in FIG. 15 described above and the grouping method described below may be applied to the neighbor blocks illustrated in FIG. 15.

FIG. 18 is a diagram illustrating a method for grouping neighbor blocks used for affine motion prediction according to an embodiment to which the present disclosure is applied.

Referring to FIG. 18, the decoder is primarily described for convenience of description, but the present disclosure is not limited thereto and the affine prediction predicting method using the neighbor affine coded block according to an embodiment of the present disclosure may be performed substantially similarly in the encoder.

In an embodiment of the present disclosure, the decoder may group the neighbor blocks of the current block into a left neighbor block group (hereinafter, referred to as a left group) (group A) 1801 and a top neighbor block group (hereinafter, referred to as a top group) (group B) 1802 in order to derive the inherited affine candidate for the affine inter mode. The decoder may group the neighbor blocks into group A 1801 and group B 1802 and derive one affine candidate in each group.

A scan order (or search order or check order) for determining the affine candidate in each group may be defined by various methods. For example, the scan order of group A 1801 may be set to {block A, block D, block G}, {block D, block A, block G}, etc., and the scan order of group B 1802 may be set to {block B, block C, block F, block E}, {block C, block B, block F, block E}, etc. In the embodiment, for convenience, description is made based on the order mentioned in the previous order, but the present disclosure is not limited to the specific order described below. For example, the scan order for deriving the affine candidate in group A 1801 may be set in the order from the bottom to the top and the scan order for deriving the affine candidate in group B 1802 may be set from the right to the left.

Specifically, the scan order within each group may be set (or determined) in various methods as follows. Further, hereinafter, the embodiment is described based on the left group (i.e., group A 1801), but may be applied even to the top group (i.e., group B 1802).

1) The decoder may use a first neighbor affine block in the order of {block A, block D, block G} or {block D, block A, block G} in the left group as the affine candidate. For example, the decoder may search from the lowest neighbor block to the uppermost neighbor block among the neighbor blocks of the left group.

Further, the decoder may use the scaled affine candidate as the candidate for the affine inter mode when the reference picture of the current block is not the same as the reference picture of the neighbor affine block.

2) The decoder may use a neighbor affine block having the same reference picture as the reference picture of the current block in the order of {block A, block D, block G} or {block D, block A, block G} in the left group as the affine candidate. That is, the decoder may add, to the affine candidate list, the first neighbor affine block in order within the left group as the affine candidate among the neighbor blocks having the same reference picture as the reference picture of the current block.

As an example, the decoder may use the scaled affine candidate as the candidate for the affine inter mode when the reference picture of the current block is not the same as the reference picture of the neighbor affine block.

3) The decoder may consider a neighbor affine block having the same reference picture as the reference picture of the current block in the order of {block A, block D, block G} or {block D, block A, block G} in the left group as the affine candidate. That is, the decoder may add, to the affine candidate list, the first neighbor affine block in order within the left group as the affine candidate among the neighbor blocks having the same reference picture as the reference picture of the current block. In addition, when there is no neighbor affine block having the same reference picture as the reference picture of the current block, the decoder may not derive the affine candidate in the corresponding group.

FIG. 19 is a diagram illustrating a method for grouping neighbor blocks used for affine motion prediction according to an embodiment to which the present disclosure is applied.

Referring to FIG. 19, the decoder is primarily described for convenience of description, but the present disclosure is not limited thereto and the affine prediction predicting method using the neighbor affine coded block according to an embodiment of the present disclosure may be performed substantially similarly in the encoder.

In an embodiment of the present disclosure, the decoder may group the neighbor blocks into a total of three groups, group A 1901, group B 1902, and group C 1903 as illustrated in FIG. 19. The decoder may group the neighbor blocks into group A 1901, group B 1902, and group C 1903 and derive one affine candidate in each group.

An inter-group scan order (or search order or check order) and/or a candidate scan order (or search order or check order) within each group may be defined in various methods. For example, the inter-group scan order (or search order or check order) may be {A (1901), B (1902), C (1903)} between the groups, or other orders may be considered. The scan order within group A 1901 may be {block A, block D} or {block D, block A}, the scan order within group B 1902 may be {block B, block C} or {block C, block B}, and the scan order within group C 1903 may be {block G, block E, block F}. In the embodiment, for convenience of description, the method is described based on the mentioned order, but the proposed method is not limited to the mentioned order. A specific method may be as follows and the description will focus on group A 1901, but the method may be similarly applied even to group B 1902 or group C 1903.

1) In group A 1901, a first neighbor affine block in the order of {block A, block D} or {block D, block A} may be used as the affine candidate. In this case, the decoder may use a scaled affine candidate as the candidate for the affine inter mode when the reference picture of the current block is different from the reference picture of the neighbor affine block.
2) In group A 1901, a neighbor affine block having the same reference picture as the current reference picture in the order of {block A, block D} or {block D, block A} may be configured as the inherited affine candidate. When there is no neighbor affine block having the same reference picture as the current reference picture, the decoder may construct the scaled affine candidate.
3) In group A 1901, a neighbor affine block having the same reference picture as the current reference picture in the order of {block A, block D} or {block D, block A} may be configured as the inherited affine candidate. When there is no neighbor affine block having the same reference picture as the current reference picture, the decoder may not derive the affine candidate in the corresponding group.

Hereinafter, for convenience of description, blocks A, B, C, D, and E in FIG. 19 are described by denoting a, b, c, d, and e, and group A 1901, group B 1902, Group C 1904 are described by denoting A 1901, B 1902, and C 1903.

As an embodiment, neighbor affine blocks may be divided into A 1901, B 1902, and C 1903 as illustrated in FIG. 19 and one inherited affine candidate may be determined in each of two groups among a total of three groups. That is, a maximum of two inherited affine candidates may be selected among three groups. In such a method, optimal inherited affine candidates may be selected only by one bit. A specific method for selecting the candidate may be as follows.

1) The order of scanning the groups may be one of the methods of Table 2 to be described later. The decoder may scan the groups until the number of inherited affine candidates becomes two in the order of scanning the groups. For example, after scanning A 1901 and B 1902 in Method 1 of Table 2, if the number of inherited affine candidates is already 2, scanning of C 1903 is omitted, and if number of inherited affine candidates is less than 2, the scanning of C 1903 may be performed.
2) The order of scanning the groups may be one of the methods of Table 2 to be described later. After determining the inherited affine candidates of each group, when the number of the inherited affine candidates is equal to or less than 2, the inherited affine candidates may be used as they are and when the number of the inherited affine candidates is 3, the inherited affine candidate having the same reference picture as the reference picture of the current block may be first considered. When all of three inherited affine candidates are generated by the neighbor blocks having the same reference picture as the reference picture of the current block, the decoder may select and use two inherited affine candidates in the group scanning order.
3) The order of scanning the groups may be one of the methods of Table 2. After determining the inherited affine candidates of each group, when the number of the inherited affine candidates is equal to or less than 2, the inherited affine candidates may be used as they are and when the number of the inherited affine candidates is 3, the inherited affine candidate having the same reference picture as the reference picture of the current block may be considered. When all of three inherited affine candidates are generated by the neighbor blocks having the same reference picture as the reference picture of the current block, the decoder may use two inherited affine candidates in an order in which the block size is larger.

Table 2 shows the order of scanning the groups. As described above, in Table 2, group A 1901, group B 1902, and group C 1903 are denoted by A, B, and C, respectively.

TABLE 2

| Method | Order |
|---|---|
| Method 1 | A → B → C |
| Method 2 | A → C → B |
| Method 3 | B → A → C |
| Method 4 | B → C → A |
| Method 5 | C → A → B |
| Method 6 | C → B → A |

Referring to Table 2, as an example, the order of scanning the groups may be adaptively determined according to the width and height of the block. For example, when width>height, A and C are more likely to have a lower spatial correlation than B and C. Therefore, in the case of width>height, it is reasonable to consider either A or C last, and thus any one of Methods 1, 3, 4, and 6 may be used for affine motion prediction. Likewise, the above-described logic may be equally considered even when width<height, and in this case, any one of Methods 1, 2, 3, and 5 may be used for affine motion prediction.

The embodiments of the present disclosure descried above have been described separately for the convenience of description, but the present disclosure is not limited thereto. That is, the embodiments described in Embodiments 1 to 3 described above may be performed independently and one or more various embodiments may be combined and performed.

FIG. 20 is a diagram illustrating an inter prediction device according to an embodiment to which the present disclosure is applied.

In FIG. 20, the inter-prediction unit is illustrated as one block for convenience of description, but the inter-prediction unit may be implemented in a component included in the encoder and/or the decoder.

Referring to FIG. 20, the inter-prediction unit implements the functions, procedures, and/or methods proposed in FIGS. 8 to 19 above. Specifically, the inter-prediction unit may be configured to include an affine candidate list configuring unit 2001, a syntax element obtaining unit 2002, a motion vector predictor deriving unit 2003, a control point motion vector deriving unit 2004, and a prediction block generating unit 2005.

The affine candidate list configuring unit 2001 adds, to an affine candidate list, an affine coded block coded in an affine prediction mode among neighbor blocks of a current block.

The syntax element obtaining unit 2002 obtains a syntax element indicating a specific candidate used for the affine motion prediction of the current block in the affine candidate list.

The motion vector predictor derivation unit 2003 derives a control point motion vector predictor of the current block based on an affine motion model of the candidate indicated by the syntax element.

The control point motion vector deriving unit 2004 derives a control point motion vector of the current block by adding a control point motion vector difference to the control point motion vector predictor. As an embodiment, the control point motion vector deriving unit 2003 may perform a motion vector difference decoding process for each control point in order to obtain the control point vector difference of each control point of the current block.

The prediction block generating unit 2005 generates a prediction sample of the current block by using the control point motion vectors of the current block. As an embodiment, the prediction block generating unit 2005 may derive the motion vector of each of a plurality of subblocks which belongs to the current block by using the control point motion vectors and generate the prediction block of the current block by using the motion vector of each of the derived subblocks.

As described above, as an embodiment, the affine coded block added to the affine candidate list may have the same reference picture as a reference picture of the current block.

As described above, as an embodiment, the affine candidate list configuring unit 2001 may group the neighbor blocks of the current block into a plurality of groups, and search the affine coded block according to a predefined order in each of the plurality of groups.

Furthermore, as described above, as an embodiment, the neighbor blocks of the current block may be grouped into a left group and a top group.

Furthermore, as described above, as an embodiment, the affine candidate list configuring unit 2001 may add a predefined maximum number of affine coded blocks to the affine candidate list, and the predefined maximum number may be set to two.

Furthermore, as described above, as an embodiment, the affine candidate list configuring unit 2001 may search a valid affine coded block among the blocks having the same reference picture as the reference picture of the current block in the left group according to a predefined order, and search a valid affine coded block among the blocks having the same reference picture as the reference picture of the current block in the top group according to a predefined order.

Furthermore, as described above, as an embodiment, the affine candidate list configuring unit 2001 may add, to the affine candidate list, an affine candidate scaled based on a picture order count between reference pictures when there is no affine coded block among the neighbor blocks of the current block.

FIG. 21 illustrates a video coding system to which the present disclosure is applied.

A video coding system may include a source device and a receiving device. The source device may forward encoded video/image information or data to the receiving device in a file or streaming format through a digital storage medium or a network.

The source device may include a video source, an encoding apparatus and a transmitter. The receiving device may include a receiver, a decoding apparatus and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display unit, and the display unit may be constructed as an independent device or an external component.

The video source may obtain video/image through processes such as capturing, composing or generating. The video source may include a video/image capturing device and/or a video/image generating device. The video/image capturing device may include one or more cameras, video/image archive including a video/image captured previously, and the like, for example. The video/image generating device may include a computer, a tablet and a smart phone, for example, and may generate video/image (electrically), for example. For example, a virtual video/image may be generated through a computer, and in this case, the video/image capturing process may be substituted by the process of generating a related data.

The encoding apparatus may encode an input video/image. The encoding apparatus may perform a series of processes including a prediction, a transform, a quantization, and the like for compression and coding efficiency.

The transmitter may forward encoded video/image information or data output in a bitstream format to the receiver of the receiving device in a file or streaming format through a digital storage medium or a network. The digital storage medium may include various storage media such as USB, SD, CD, DVD, Blu-ray, HDD, SSD, and the like. The transmitter may include an element for generating a media file through a predetermined file format and may include an element for transmitting through broadcasting/communication network. The receiver may extract the bitstream and forward it to the decoding apparatus.

The decoding apparatus may perform a series of processes including a dequantization, an inverse transform, a prediction, and the like that corresponds to the operation of the encoding apparatus and decode video/image.

The renderer may render the decoded video/image. The rendered video/image may be displayed through the display unit.

FIG. 22 is a configuration diagram of a content streaming system as an embodiment to which the present disclosure is applied.

The content streaming system to which the present disclosure is applied may include an encoding server, a streaming server, a web server, a media storage, a user equipment, and multimedia input devices.

The encoding server serves to compress content input from multimedia input devices such as a smartphone, a camera and a camcorder into digital data to generate a bitstream and transmit the bitstream to the streaming server. As another example, when the multimedia input devices such as a smartphone, a camera and a camcorder directly generate bitstreams, the encoding server may be omitted.

The bitstream may be generated by an encoding method or a bitstream generation method to which the present disclosure is applied and the streaming server can temporarily store the bitstream in the process of transmitting or receiving the bitstream.

The streaming server transmits multimedia data to the user equipment on the basis of a user request through the web server and the web server serves as a medium that informs a user of services. When the user sends a request for a desired service to the web server, the web server delivers the request to the streaming server and the streaming server transmits multimedia data to the user. Here, the content streaming system may include an additional control server, and in this case, the control server serves to control commands/responses between devices in the content streaming system.

The streaming server may receive content from the media storage and/or the encoding server. For example, when content is received from the encoding server, the streaming server can receive the content in real time. In this case, the streaming server may store bitstreams for a predetermined time in order to provide a smooth streaming service.

Examples of the user equipment may include a cellular phone, a smartphone, a laptop computer, a digital broadcast terminal, a PDA (personal digital assistant), a PMP (portable multimedia player), a navigation device, a slate PC, a tablet PC, an ultrabook, a wearable device (e.g., a smartwatch, a smart glass and an HMD (head mounted display)), a digital TV, a desktop computer, a digital signage, etc.

Each server in the content streaming system may be operated as a distributed server, and in this case, data received by each server can be processed in a distributed manner.

The embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VOD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blueray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method for decoding a video signal, the method comprising:

determining a block coded in an affine prediction mode among neighbor blocks of a current block as an affine candidate based on the block having a same reference picture as a reference picture of the current block;

obtaining a syntax element related to the affine candidate used for affine motion prediction of the current block;

deriving a control point motion vector predictor of the current block based on the affine candidate related to the syntax element;

deriving a control point motion vector of the current block based on a control point motion vector difference and the control point motion vector predictor;

generating prediction samples of the current block based on the control point motion vector of the current block; and generating reconstructed samples of the current block based on the prediction samples of the current block, wherein the determining of the block further comprises:

grouping the neighbor blocks of the current block into a first group and a second group; and searching the block coded in the affine prediction mode based on a predefined order in respective ones of the first group and the second group, wherein the first group includes left neighbor blocks of the current block, and the second group includes top neighbor blocks of the current block.

2. The method of claim 1, wherein the determining of the block further comprises:

determining a predefined maximum number of blocks coded in the affine prediction mode as affine candidates, and wherein the predefined maximum number is two.

3. The method of claim 1, wherein the determining of the block further comprises:

searching a valid affine coded block among blocks having the same reference picture as the reference picture of the current block in the first group according to the predefined order, and searching a valid affine coded block among blocks having the same reference picture as the reference picture of the current block in the second group according to the predefined order.

4. The method of claim 1, wherein the determining of the block further comprises:

determining an affine candidate scaled based on a picture order count between reference pictures when there is no affine coded block among the neighbor blocks of the current block.

5. The method of claim 1, wherein the determining of the block further comprises:

determining 0 or 1 block coded in the affine prediction mode in the respective ones of the first group and the second group as the affine candidate.

6. A method for encoding a video signal, the method comprising:

determining a block coded in an affine prediction mode among neighbor blocks of a current block as an affine candidate based on the block having a same reference picture as a reference picture of the current block;

selecting the affine candidate used for the affine motion prediction of the current block among affine candidates;

deriving a control point motion vector predictor of the current block based on the selected affine candidate;

deriving a control point motion vector of the current block based on a control point motion vector difference and the control point motion vector predictor;

generating prediction samples of the current block based on the control point motion vector of the current block;

generating residual samples of the current block based on the prediction samples; and generating a syntax element related to the selected affine candidate among the affine candidates, wherein the determining of the block further comprises:

grouping the neighbor blocks of the current block into a first group and a second group; and searching the block coded in the affine prediction mode based on a predefined order in respective ones of the first group and the second group, wherein the first group includes left neighbor blocks of the current block, and the second group includes top neighbor blocks of the current block.

7. The method of claim 6, wherein the determining of the block further comprises:

determining a predefined maximum number of blocks coded in the affine prediction mode as the affine candidates, and wherein the predefined maximum number is two.

8. The method of claim 6, wherein the determining of the block further comprises:

searching a valid affine coded block among blocks having the same reference picture as the reference picture of the current block in the first group according to the predefined order, and searching a valid affine coded block among blocks having the same reference picture as the reference picture of the current block in the second group according to the predefined order.

9. The method of claim 6, wherein the determining of the block further comprises:

determining 0 or 1 block coded in the affine prediction mode in the respective ones of the first group and the second group as the affine candidate.

10. A method for transmitting data for a video signal, the method comprising:

generating a bitstream for the video signal, wherein the bitstream is generated based on:

determining a block coded in an affine prediction mode among neighbor blocks of a current block as an affine candidate based on the block having a same reference picture as a reference picture of the current block;

selecting the affine candidate used for the affine motion prediction of the current block among affine candidates;

deriving a control point motion vector predictor of the current block based on the selected affine candidate;

deriving a control point motion vector of the current block based on a control point motion vector difference and the control point motion vector predictor;

generating prediction samples of the current block based on the control point motion vector of the current block;

generating residual samples of the current block based on the prediction samples; and generating a syntax element related to the selected affine candidate among the affine candidates; and transmitting the data comprising the bitstream, wherein the determining of the block further comprises:

grouping the neighbor blocks of the current block into a first group and a second group; and searching the block coded in the affine prediction mode based on a predefined order in respective ones of the first group and the second group, wherein the first group includes left neighbor blocks of the current block, and the second group includes top neighbor blocks of the current block.

* * * * *